(12) United States Patent
Donabedian et al.

(10) Patent No.: US 9,239,834 B2
(45) Date of Patent: Jan. 19, 2016

(54) SYSTEMS, METHODS AND APPARATUS FOR DYNAMIC CONTENT MANAGEMENT AND DELIVERY

(71) Applicant: GLOBILI LLC, Cincinnati, OH (US)

(72) Inventors: William A. Donabedian, Cincinnati, OH (US); Randall L. Mullins, Cincinnati, OH (US)

(73) Assignee: Globili LLC, Cincinnati, OH (US)

( * ) Notice: Subject to any disclaimer, the term of this patent is extended or adjusted under 35 U.S.C. 154(b) by 0 days.

(21) Appl. No.: 14/538,852

(22) Filed: Nov. 12, 2014

(65) Prior Publication Data

US 2015/0066993 A1    Mar. 5, 2015

Related U.S. Application Data

(63) Continuation of application No. 13/916,782, filed on Jun. 13, 2013, now Pat. No. 9,092,442, which is a continuation of application No. 13/672,108, filed on Nov. 8, 2012, now Pat. No. 8,494,838.

(60) Provisional application No. 61/558,215, filed on Nov. 10, 2011, provisional application No. 61/641,595, filed on May 2, 2012.

(51) Int. Cl.
| | |
|---|---|
| G06F 17/20 | (2006.01) |
| G06F 17/28 | (2006.01) |
| H04L 29/08 | (2006.01) |
| G06F 17/22 | (2006.01) |
| G06F 17/30 | (2006.01) |
| G06F 17/24 | (2006.01) |

(52) U.S. Cl.
CPC .......... G06F 17/289 (2013.01); G06F 17/2235 (2013.01); G06F 17/24 (2013.01); G06F 17/28 (2013.01); G06F 17/30091 (2013.01); G06F 17/30879 (2013.01); H04L 67/025 (2013.01); H04L 67/10 (2013.01); H04L 67/22 (2013.01)

(58) Field of Classification Search
CPC ................................................ G06F 17/30879
USPC ......................................................... 704/8, 2
See application file for complete search history.

(56) References Cited

U.S. PATENT DOCUMENTS

| | | | | |
|---|---|---|---|---|
| 6,459,388 B1* | 10/2002 | Baron | ................... | G08G 1/0962 |
| | | | | 340/995.1 |
| 7,634,065 B2* | 12/2009 | Fukunaga | ............. | H04M 3/533 |
| | | | | 358/1.13 |
| 7,761,326 B2* | 7/2010 | Miyaoku | ........... | G06F 17/30876 |
| | | | | 382/214 |
| 8,016,197 B2* | 9/2011 | Furuyama | .......... | G06K 7/10722 |
| | | | | 235/454 |
| 8,363,944 B2* | 1/2013 | Koike | ................... | G06F 21/608 |
| | | | | 382/181 |

(Continued)

*Primary Examiner* — Jakieda Jackson
(74) *Attorney, Agent, or Firm* — Ulmer & Berne LLP

(57) ABSTRACT

Systems, methods and apparatus are disclosed for linking virtual content to various types of object, such a static physical objects, through the use of triggers of varying formats. The virtual content can be updated by a content curator over time.

18 Claims, 25 Drawing Sheets

(56) References Cited

U.S. PATENT DOCUMENTS

| | | | | |
|---|---|---|---|---|
| 8,768,313 | B2* | 7/2014 | Rodriguez | G06K 9/00986 382/118 |
| 8,833,654 | B1* | 9/2014 | Grant | G06Q 10/0833 235/383 |
| 2003/0065504 | A1* | 4/2003 | Kraemer | G06F 17/289 704/8 |
| 2003/0115059 | A1* | 6/2003 | Jayaratne | G10L 15/005 704/235 |
| 2003/0155413 | A1* | 8/2003 | Kovesdi | G06F 17/30873 235/375 |
| 2003/0200078 | A1* | 10/2003 | Luo | G06F 17/2863 704/2 |
| 2004/0210444 | A1* | 10/2004 | Arenburg | G06F 17/275 704/277 |
| 2005/0108646 | A1* | 5/2005 | Willins | G01S 3/803 715/723 |
| 2005/0203748 | A1* | 9/2005 | Levas | G06F 17/30011 704/275 |
| 2007/0005849 | A1* | 1/2007 | Oliver | G06F 3/03545 710/72 |
| 2007/0136068 | A1* | 6/2007 | Horvitz | G06F 17/289 704/270 |
| 2009/0177462 | A1* | 7/2009 | Alfven | G06F 17/289 704/3 |
| 2010/0046842 | A1* | 2/2010 | Conwell | G06F 17/30265 382/218 |
| 2010/0100907 | A1* | 4/2010 | Chang | G06F 3/01 725/46 |
| 2010/0161311 | A1* | 6/2010 | Massuh | G06F 17/3087 704/7 |
| 2010/0185434 | A1* | 7/2010 | Burvall | G06F 17/289 704/3 |
| 2012/0035907 | A1* | 2/2012 | Lebeau | G06F 17/28 704/2 |
| 2012/0109632 | A1* | 5/2012 | Sugiura | G06F 17/289 704/3 |
| 2012/0199644 | A1* | 8/2012 | Kearney | G06Q 30/02 235/375 |
| 2012/0221474 | A1* | 8/2012 | Eicher | G09C 5/00 705/51 |
| 2012/0329386 | A1* | 12/2012 | Reyner | G06K 1/18 455/41.1 |
| 2013/0059603 | A1* | 3/2013 | Guenec | G06Q 10/02 455/456.2 |
| 2013/0130741 | A1* | 5/2013 | Grimard | A45C 13/42 455/556.1 |
| 2013/0344853 | A1* | 12/2013 | Lee | G06F 17/30879 455/414.1 |

* cited by examiner

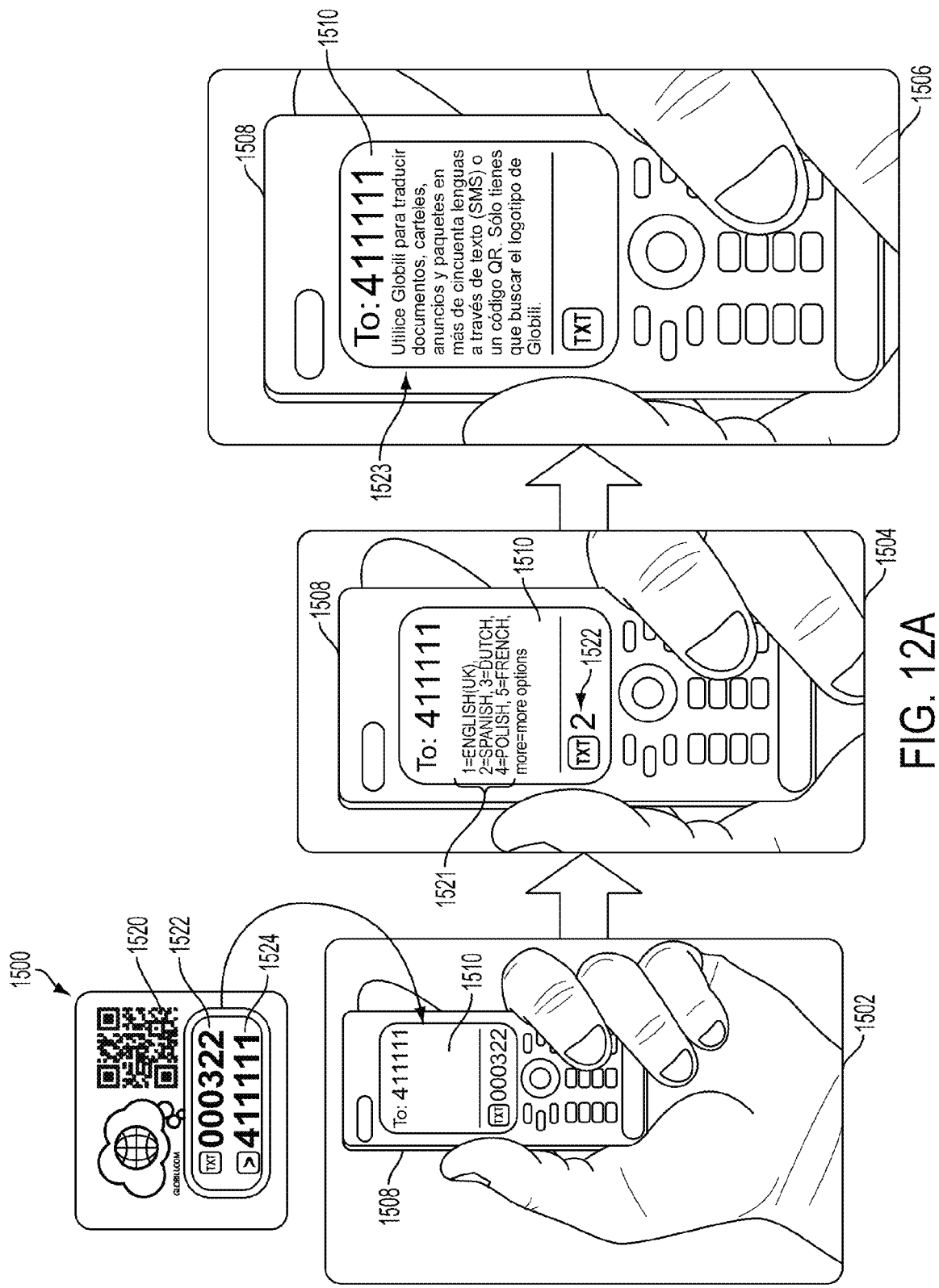

FIG. 15A

SYSTEMS, METHODS AND APPARATUS FOR DYNAMIC CONTENT MANAGEMENT AND DELIVERY

CROSS-REFERENCE TO RELATED APPLICATIONS

This application is a continuation of U.S. application Ser. No. 13/916,782, filed on Jun. 13, 2013, entitled SYSTEMS, METHODS AND APPARATUS FOR DYNAMIC CONTENT MANAGEMENT AND DELIVERY, which is a continuation application of U.S. application Ser. No. 13/672,108, filed on Nov. 8, 2012, entitled SYSTEMS, METHODS AND APPARATUS FOR DYNAMIC CONTENT MANAGEMENT AND DELIVERY, which claims priority to the disclosures of U.S. Provisional Patent Application Ser. No. 61/558,215, entitled COMPUTER-BASED TRANSLATION OF VISUAL ITEMS UTILIZING MESSAGING CODES AND TWO-DIMENSIONAL CODES, filed Nov. 10, 2011 and U.S. Provisional Patent Application Ser. No. 61/641,595, entitled COMPUTER-BASED TRANSLATION OF VISUAL ITEMS UTILIZING MESSAGING CODES, TWO-DIMENSIONAL CODES AND WIRELESS COMMUNICATION, filed May 2, 2012, the disclosures of which are all incorporated herein by reference in their entirety.

BACKGROUND

Machine-based translation of text, documents, web pages and the like have been popular since the late 1990's. With the introduction of Babelfish, Google Translate, Wordlingo, Freetranslation and other web-based translation services, people can obtain translations of text with an acceptable degree of accuracy.

BRIEF DESCRIPTION OF THE DRAWINGS

Embodiments of the present invention are illustrated by way of example and not limitation in the figures of the accompanying drawings, in which like references indicate similar elements and in which:

FIGS. 12A-12B depicts example language selection processes.

FIGS. 15A-15B depict another exemplary user interface allowing a content curator to interact with a content management system.

DETAILED DESCRIPTION

Figure 1:
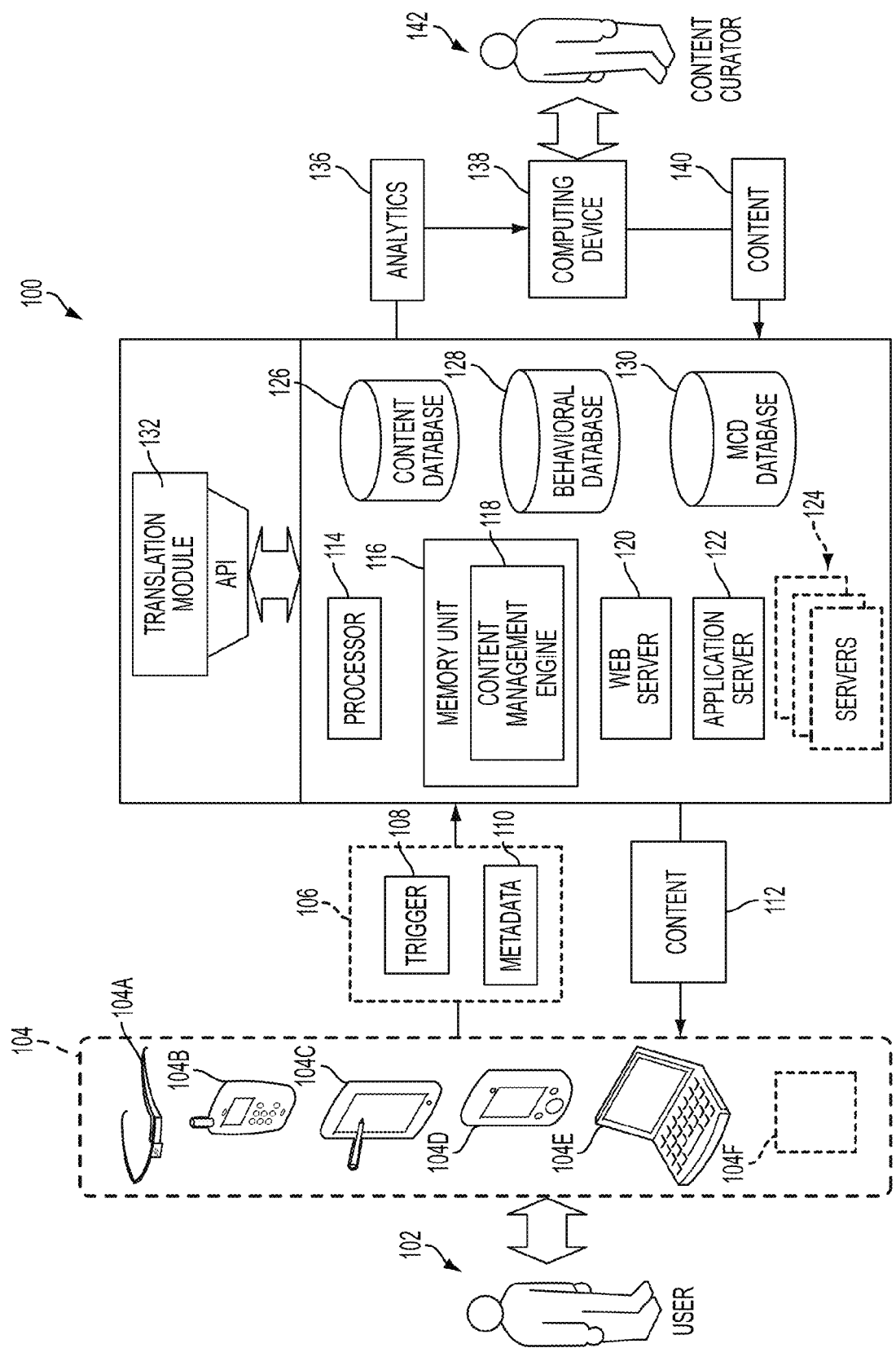
FIG. 1 depicts an example computer-based content management system.

The presently disclosed system and methods can generally allow for the management and delivery of content. The content, sometimes referred to as "virtual content", can be associated with or otherwise relate to an object. In some embodiments, the object is a physical object, such as a sign, advertisement, person, map, nametag, luggage tag, business card, packaging, document, product, or other suitable physical object. In other embodiments, the associated object is not necessarily a physical object, but instead is a geographical location, an audio waveform, or other non-tangible object, for example. The content, which can be provided by a content curator, for example, can include any suitable types of media, such as image content, text content, audio content, video content, and combinations thereof. Once the content has been supplied to the system, the content can be updated, or otherwise manipulated over time by the content curator or other affiliated parties. Thus, while the object associated with the content may be considered static, the curated content stored by the system can generally be considered to be "dynamic content."

In accordance with the systems and methods described herein, various parts of the content supplied by the content curator, such as the text-based portion of the content, can be translated into a variety of different languages. Any suitable translation technique can be utilized to translate the text-based portion of the content, including human-based translation and machine-based translation. The machine-based translation can be performed locally at the system or by a remote system, such as through application programming interface (API) calls. In any event, each translation of the content can be stored by the system for subsequent transmission to a mobile communication device. In some embodiments, subsequent to the translation, the content curator can further modify the translated content and store the modified translated content. For example, the originally-supplied content may include colloquialisms that do not translate accurately to other languages through conventional machine-based translations. The content curator, which includes its agents, affiliates, partners, representatives, and so forth, can selectively alter the translation for one or more of the language translations so that the translated message would adequately convey the content in that particular language. Altering the translations can also be used to address regional-based distinctions. For example, a product may be offered under a first trademark in the United States but offered under a second trademark in Europe. For the curated content associated with that product in Europe, the translation for the European languages can be changed to include the second trademark.

One or more triggers can be associated with or otherwise tied to the content stored by the system. As described in more detail below, a wide variety of different trigger types can be utilized by the system. One or more triggers can be assigned to the various content stored by the system. By way of example, upon entry of content into the system by the content curator, a corresponding trigger can be generated by the system and an indication of the trigger can be provided to the content curator. In some embodiments, for example, a short message service (SMS) code, an image of a barcode or quick response (QR) code can be generated by the system and provided to the content curator. In other embodiments, the trigger can be provided in other formats. In some embodiments, the trigger is based on biometric data received from a user (such as a biometric code) or genetic information of the user (such as a genetic code). In any event, that trigger can then be associated with an object, such as by attaching the trigger to the object, printing the trigger on the object, embedding the trigger in the object, or any other suitable association technique.

As described in more detail below, a user operating a mobile communications device in proximity to that object can transmit the trigger to the system. Upon receipt of the trigger, the system can cross-reference the received trigger to its associated content stored by the system. That content can then be provided to the mobile communications device through network communications so that it can be viewed by the user of the mobile communications device. The content can be provided in any suitable format, such via a text message, an email message, a webpage in a web browser, a multimedia message, an instant message, and the like.

The presently disclosed system and methods can also beneficially allow the user of a mobile communications device to receive a version of the content that has been translated into a different language so that the user can readily comprehend the content. The preferred language of the user can be ascertained by the system using any of a variety of techniques. In one embodiment, upon receipt of a trigger from a mobile communications device, a language list is sent to the mobile communications device. The language list may identify all of the different languages in which content can be delivered and request that the user select one of the languages. Alternatively, the language list may merely identify a subset of all of the different languages in which content can be delivered and request the user select one language. The particular languages in the subset can be determined, for example, based on an identifier that was received from the mobile communications device. The identifier can be, for example, a country code or other type of geographic identifier, a telephone number, or an IP address. In any event, upon receiving the selected language from the user, content that has been translated in the selected language can be delivered to the mobile communications device.

As is to be appreciated, the presently disclosed systems and methods can be implemented in a variety of environments, industries and applications. One example industry is the travel/hospitality industry. Utilizing the systems and methods disclosed herein, people traveling to foreign-speaking locations can receive relevant, up-to-date information delivered to their mobile communications device that has been translated into the traveler's native language. Triggers can be associated with objects and/or environments in which a traveler would likely encounter during a trip. As it to be appreciated, any suitable objects can be associated with one or more triggers, but example objects include menus, signage, advertisements, and so forth. The triggers can be placed in environments that travelers would typically encounter, such as train stations, airports, cruise ships, public transportation stations, hotels, resorts, and so forth. Other non-limiting examples of environments, industries and/or applications that can benefit from the systems and methods described herein include hospitals, stadiums, grocery stores, casinos, tourist attractions, theme parks, historical attractions, and any other places likely to have international travelers.

In some embodiments, analytics pertaining to users' interaction with the system is stored so that reporting can be provided to the content curator or other interested parties. Stored Information can include, for example, the triggers that were sent by the user, the content that was sent to the user, language preferences, time/date stamps, locations of the triggers, mobile communications device information, user identification information, and so forth. As it to be appreciated, such stored information could be of great interest to a variety of entities. Such information can allow a country's tourism board, for example, to track the travel patterns of users speaking that country's language. Through analysis of the data received and stored by the system, it could be determined that travelers speaking a certain German dialect tend to visit a particular area in Chicago, tend to stay in a particular chain of hotels, and tend to visit the United States in the fall and Australia in the spring, for example.

Through analysis of the data received and stored by the system, targeted deals, advertisements, or other offerings can be sent to particular mobile communications devices. For example, it may be determined that a particular user has sent a high number of triggers that are associated with a particular hotel chain. The hotel chain can deduce the user is a frequent guest of the hotel and can send to the user a promotional offer in recognition of the user's brand loyalty. In some embodiments, a user associated with the mobile communications device can maintain a user account. Through the user account, the user can view the content received based on various trigger transmissions, set language preferences, receive offers or deals, and otherwise manage their account. Through this user account, the user can also supply a variety of demographic related data, such as age, gender, and so forth, which can be used by the system to further analytical purposes. In some embodiments, the user can also store data within their account related to their loyalty cards and/or rewards cards that are typically offered by retail establishments. This additional user-related information can be used by the system for analytical purposes.

The presently disclosed system and methods can also allow for multi-language messaging between two or more users with substantially real-time translation. As described in more detail below, a first user interacting with the system can supply a message that is typed in a first language and direct the message to a second user. The system can receive the message, translate the message into a second language (i.e., a language comprehendible by the second user), and supply the translated message to the second user. The second user can reply to the translated message by typing a message using their native language and send it through the system to the first user. The system will translate the message to the first language so that the first user can read the message. During the messaging session, each user can be interacting with a software application that is being executed locally on the user's respective mobile communications device. The application can present a virtual keyboard to each user that has a character set that is specific to the user's language of choice. In some embodiments, the messaging session is hosted through a web-based interface, with virtual keyboards being provided through the web browser.

Such multi-language messaging can be implemented in a wide variety of environments or contexts. For example, participants at an international event can each be associated with a trigger (such as by a barcode or number printed on their nametag or printed in a brochure or program, for example). A first participant wanting to communicate with a second participant can identify the desired recipient of the message by transmitting the recipient's trigger to the system. Upon receiving the trigger and the associated message, the system can translate the message into the language associated with the recipient. That language could have been identified earlier by the recipient (such as via the recipient's user account), or the system can send a language list to the recipient and request the recipient select a preferred language. In any event, the first participant and the second participant can then exchange text-based communications, with each communication written in the participants' native language and translated in substantially real-time.

Multi-language messaging can also be implemented, for example, in the hospitality sector. A trigger can be positioned in a hotel room with an indication that the hotel guest can communicate with the front desk staff through activation of the trigger. Thus, a hotel guest who might not speak the language of the front desk staff can interact with the front desk staff through multi-language messaging. The hotel guest can, for example, send a text message with the indicated trigger to the system. The text message can be typed by the guest in their native language. The system will receive the message and translate the message into a language associated with the front desk staff. The message can then be delivered to a computing device associated with the front desk staff. The front desk staff can respond to the communication, which can then be translated into the language of the guest and routed to the mobile communications device associated with the hotel guest.

In some implementations, the systems and methods described herein for multi-language messaging can be used as a "walk-up" translation station that can be placed, for example, at the front desk of a hotel or any other suitable location. The translation station can include a first mobile communications device for use by a hotel guest and a second mobile communication device for use by a hotel representative. The first mobile communications device can be placed in close proximity to the second mobile communications device. A hotel guest can walk-up to the first mobile communications device and type in a message kiosk in their native language. The message can be translated into a language that is readable by the hotel representative and then presented on the display of the second mobile communications device. Additional details regarding an example embodiments are described below with regard to FIGS. 6-7.

It is noted that reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Referring now to FIG. 1, one example embodiment of the present disclosure can comprise a computer-based content management system 100. The content management system 100 can be provided using any suitable processor-based device or system, such as a personal computer, laptop, server, mainframe, or a collection (e.g., network) of multiple computers, for example. The content management system 100 can include one or more processors 114 and one or more computer memory units 116. For convenience, only one processor 114 and only one memory unit 116 are shown in FIG. 1. The processor 114 can execute software instructions stored on the memory unit 116. The processor 114 can be implemented as an integrated circuit (IC) having one or multiple cores. The memory unit 116 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 116 can store executable software and data for a content management engine 118. When the processor 114 of the content management system 100 executes the software of the content management engine 118, the processor 114 can be caused to perform the various operations of the content management system 100, such as receive content, associate a trigger with content, and provide the content to user communications devices upon receipt of the trigger, receive updates to the content, provide reporting/analytics, and coordinate multi-language messaging, as discussed in more detail below.

Data used by the group content management engine 118 can be from various sources, such as a content database 126, behavioral database 128, mobile communications database 130, which can be electronic computer databases, for example. The data stored in the databases 126, 128, 120 can be stored in a non-volatile computer memory, such as a hard disk drive, a read only memory (e.g., a ROM IC), or other types of non-volatile memory. In some embodiments, one or more databases 126, 128, 130 can be stored on a remote electronic computer system, for example. As it to be appreciated, a variety of other databases, or other types of memory storage structures, can be utilized or otherwise associated with the content management system 100.

The content management system 100 can be in communication with mobile communications devices, referred to generally as 104, via an electronic communications network. The communications network can include a number of computer and/or data networks, including the Internet, LANs, WANs, GPRS networks, etc., and can comprise wired and/or wireless communication links. In addition to the mobile communications devices 104, the content management system 100 can be in networked communication with other devices, such as a computing device 138 associated with a content curator 142. Through the computer device 138, a content curator 142 can provide content 140 to the content management system 100 and, in some embodiments, receive analytics 136. As described in more detail below, the content curator 102 can interact with the content management system 100 through a web or application-based user interface presented to the content curator 102 through the computing device 138.

The content 140 supplied by the content curator can include any suitable type of language-based content. Language-based content broadly includes any variety of content that includes a written or spoken language component, such as audio-based content, video-based content, image-based content, and text-based content, for example.

By way of example, audio-based content can include a song with lyrics spoken or sang in a first language. The lyrics can be translated into different languages and sent to mobile communications devices in accordance with the presently described systems and methods.

The video-based content can include an audio component that includes words spoken or sang in a particular language, which can be translated into different languages. In some cases, the video-based content can additionally or alternatively include a text component, such as in the form of subtitles or other words graphically presented within the video. This text component of the video-based content can be translated into different languages.

The image-based content can include still images or graphics that include a text component. This text component of the video-based content can be translated into different languages.

The text-based content which can be provided by the content curator 102 can broadly include words or letters written in a first language that can be translated into different languages. For ease and simplicity of description, many of the embodiments described herein are described in terms of processing text-based content. The present disclosure is not so limited, as any type of language-based content can be supplied to and managed by the content management system 100.

Referring still to FIG. 1, a user 102 can be associated with the mobile communications device 104, which can be any type computer device suitable for communication over the network, such as a wearable computing device 104A, a mobile telephone 104B, a tablet computer 104C, a device that is a combination handheld computer and mobile telephone 104D (sometimes referred to as a "smart phone"), a personal computer 104E (such as a laptop computer, netbook computer, desktop computer, and so forth), or any other suitable mobile communications device 104F, such as personal digital assistants (PDA), mobile gaming devices, or media players, for example. Examples of wearable computing device 104A (sometimes referred to as a "wearable") includes devices that incorporate an augmented reality head-mounted display as well as other computing devices that can be worn on or within the body of the user 102.

In some example embodiments, the mobile communications device 104 can be arranged to perform data communications functionality in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks can employ infrared (IR) techniques or near-field communication techniques and protocols, such as electromagnetic induction (EMI) techniques including passive or active radio-frequency identification (RFID) protocols and devices. The user device 102 can comprise one or more internal and/or external antennas to support operation in multiple frequency bands or sub-bands such as the 2.4 GHz range of the ISM frequency band for Wi-Fi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and others.

The mobile communications device 104 can, in some embodiments, provide a variety of applications for allowing the user 102 to accomplish one or more specific tasks using the content management system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), and so forth. The mobile communications device 104 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a PALM OS, MICROSOFT OS, APPLE OS, ANDROID OS, UNIX OS, LINUX OS, SYMBIAN OS, EMBEDIX OS, Binary Runtime Environment for Wireless (BREW) OS, JavaOS, a Wireless Application Protocol (WAP) OS, and others.

The mobile communications device 104 can include various components for interacting with the content management system 100, such as a display for presenting the virtual content, a camera for scanning various types of triggers, and a keypad for inputting data and/or commands. The mobile communications device 104 can include other components for use with one or more applications such as a stylus, a touch-sensitive screen, keys (e.g., input keys, preset and programmable hot keys), buttons (e.g., action buttons, a multi-directional navigation button, preset and programmable shortcut buttons), switches, a microphone, speakers, an audio headset, and so forth.

User 102 can interact with the content management system 100 via a variety of other electronic communications techniques, such as, without limitation, HTTP requests, and short message service (SMS) messages. The electronic communications can be generated by a specialized application executed on the mobile communications device 104 or can be generated using one or more applications that are generally standard to the mobile communications device 104. The applications can include or be implemented as executable computer program instructions stored on computer-readable storage media such as volatile or non-volatile memory capable of being retrieved and executed by a processor to provide operations for the mobile communications device 104. The memory can also store various databases and/or other types of data structures (e.g., arrays, files, tables, records) for storing data for use by the processor and/or other elements of mobile communications device 104.

As shown in FIG. 1, the content management system 100 can include several computer servers and databases. For example, the content management system 100 can include one or more web servers 120, application servers 122, and/or any other type of servers 124. For convenience, only one web server 120 and one application server 122 are shown in FIG. 1, although it should be recognized that the disclosure is not so limited. The servers can cause content to be sent to the to the mobile communication device 104 in any number of formats, such as text-based messages, multimedia message, email messages, smart phone notifications, web pages, and so forth. The servers 120, 122, 124 can comprise processors (e.g., CPUs), memory units (e.g., RAM, ROM), non-volatile storage systems (e.g., hard disk drive systems), etc. The servers 120, 122, 124 can utilize operating systems, such as Solaris, Linux, or Windows Server operating systems, for example.

The web server 120 can provide a graphical web user interface through which various users of the system can interact with the content management system 100. The web server 120 can accept requests, such as HTTP requests, from clients (such as web browsers on the mobile communications device 104 or the computing device 138), and serve the clients responses, such as HTTP responses, along with optional data content, such as web pages (e.g., HTML documents) and linked objects (such as images, video, and so forth).

The application server 122 can provide a user interface for users who do not communicate with the content management system 100 using a web browser. Such users can have special software installed on their mobile communications device 104 that allows them to communicate with the application server 122 via the network. In some embodiments, the special software is configured to display a selected language-specific virtual keyboard that contains the specialized characters for a selected language. Such software can be downloaded, for example, from the content management system 100, or other software application provider, over the network to such mobile communications devices 104.

Figure 6:
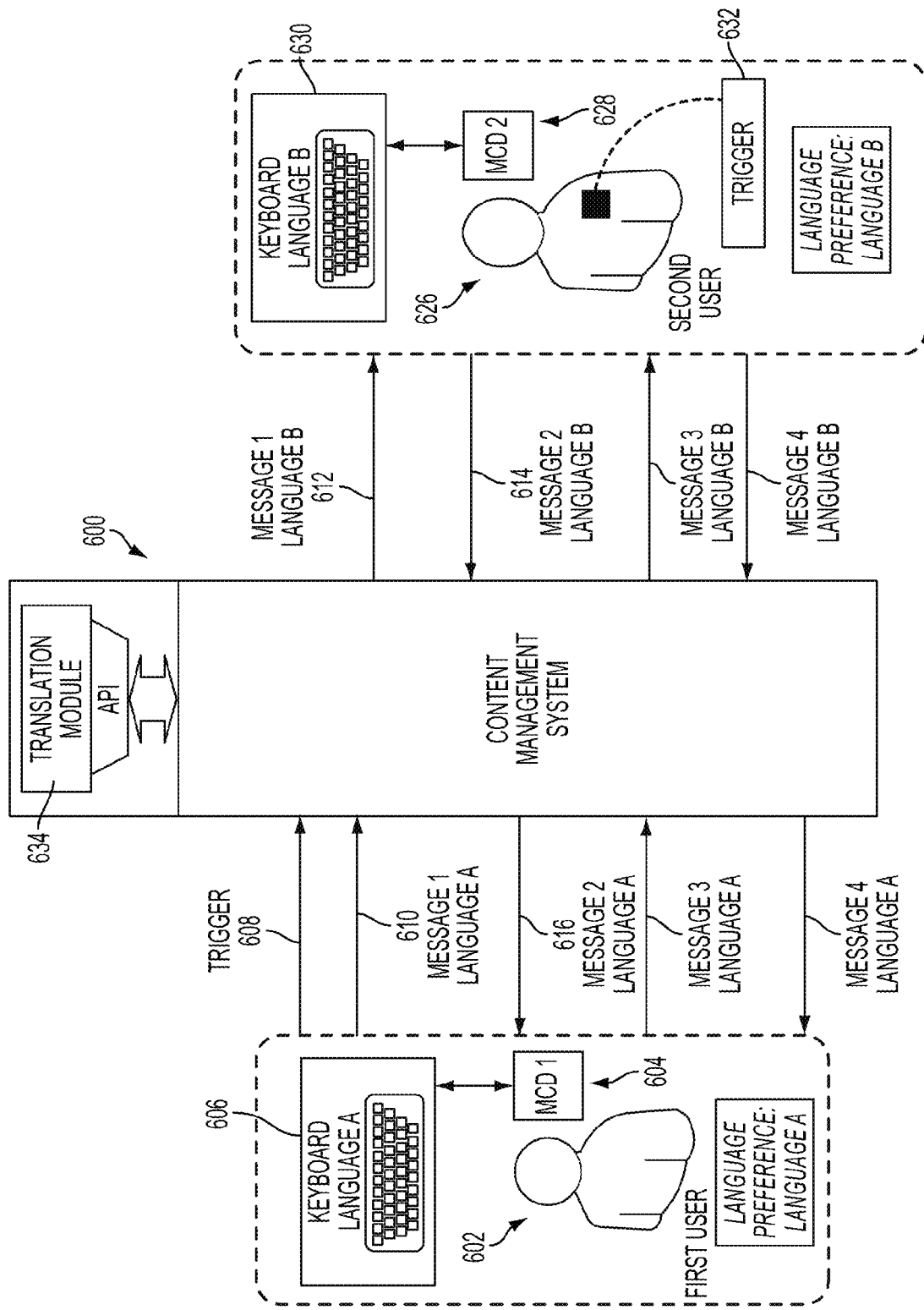
FIG. 6 depicts an example multi-language messaging session between two users that is coordinated by a content management system.

The user interface provided by the web server 120 or the application server 122, as the case may be, can permit users via mobile communications device 104 to communicate with each other in real-time techniques described herein (see FIG. 6, below). For embodiments that provide multi-language messaging, the content management system 100 can include an instant messaging server (not shown) or other components for handling the instant messaging communications between the users.

In some embodiments, the content management system 100 can communicate with a translation module 132 that generally performs machine-based translation of the content 140 supplied by the content curator 142. In the illustrated embodiment, an application programming interface (API) is utilized to communication with the translation module 132, although the disclosure is not so limited. In some embodiments, for example, the translation module is local to the content management system 100. In other embodiments, translation services are provided by human translators that are either local or remote to the content management system 100. For example, a content curator 142 can optionally select the type of translation (human or machine) to be used for particular content 140. The content curator 142 may indicate through interactions with the system that for a particular piece of content, certain languages translations are to be obtained through machine-based translations while other language translations are to be obtained through human-based translations. With regard to the human-based translations, the content management system 100, upon selection of the human-based translation option by the content curator 142, can automatically send an electronic indication to a human-based translation service (not shown) requesting a translation. A human-translator at the human-based translation service can interact with the content management system 100, such an through a graphical user interface, to translate the content 140 into one or more languages.

In any event, translated content can be stored in the content database 126 for subsequent transmission to a mobile communications device 104. The translation module 132 can also be utilized during the multi-language messaging functionality supplied by the content management system 100 to provide substantially real-time language translation of messages between users.

As indicated by wireless communication 106, the mobile communications device 104 can provide various forms of information to the content management system 100. The wireless communication 106 can be transmitted to the content management system 100 in any suitable format, such as a text-message based communication, an application communication, a web-based communication, or any other type of suitable network communication. In some embodiments, the wireless communication 106 comprises a trigger 108 along with various types of metadata 110. The metadata 110 can include, for example, an identifier such as a country code or mobile telephone number. The metadata 110 can also include device information and/or a variety of other information that can be used by the content management system 100. Additional details regarding example types of metadata is discussed below with reference to FIG. 9.

Upon receipt of the trigger 108 and associated metadata 110, the content management system 100 can query the content database 126 and retrieve content from the content database 126 that is affiliated with the trigger 108. The content affiliated with the trigger, shown as content 112 in FIG. 1, can then be transmitted to the mobile communications device 104. As described in more detail below, the content 112 provided to the mobile communications device can be content that has been translated by the translation module 132 so that the user 102 can readily comprehend the content. The content 112 can be provided to the mobile communications device 104 in a variety of formats. For example, a website address can be transmitted to the mobile communications device that is accessible by the mobile communications device 104 to access the content associated with the content management system 100. In other embodiments, the content 112 can be a text-based message, or any other suitable format.

Although FIG. 1 depicts a limited number of elements for purposes of illustration, it can be appreciated that the content management system 100 can include more or less elements as well as other types of elements in accordance with the described embodiments. Elements of the content management system 100 can include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

Figure 2:
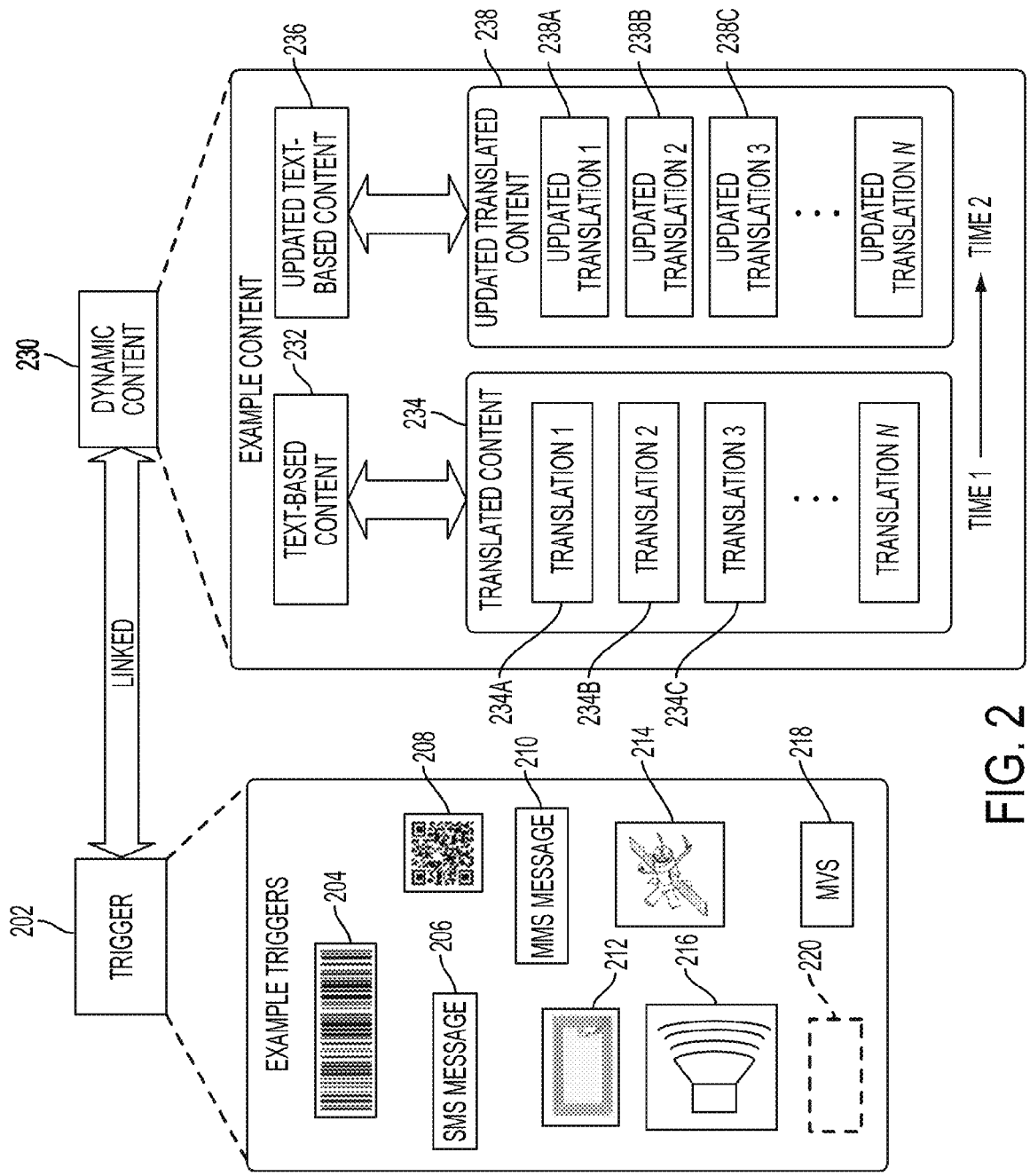
FIG. 2 depicts a linking of a trigger to dynamic content by a content management system.

FIG. 2 depicts a linking of a trigger 202 to dynamic content 230 by a content management system in accordance with the system and methods described herein. Example types of triggers include, without limitation, a barcode 204, a SMS short message code 206, a QR code 208, an RFID code 212, a geographical code 214, an audio code 216, a visual-based code 218, or any other suitable type of trigger, shown as 220. Referring to FIGS. 1 and 2, the trigger 202 can be assigned to the dynamic content 230 when the dynamic content 230 is first provided to the content management system 100 by the content curator 142. A representation of the trigger 202 can be provided by the content management system 100 to the content curator 142 in any suitable format. For example, a downloadable image file of the QR code 208 can be made available to the content curator 142. Alternatively, a SMS short message code 206 associated with the dynamic content 230 can be generated and provided to the content curator 142. As described in more detail below, the content curator 142 can then associate that trigger 202 with an object in the physical world to link that object to the dynamic content 230 stored by the content management system 100. It is noted, however, that dynamic content 230 linked to the trigger 202 can vary based on the type of trigger. For example, dynamic content 230 linked to a SMS message 206 can be different than the dynamic content 230 linked to a QR code 208, as the format in which the content will be displayed to the user will differ. An example of dynamic content differing based on trigger is shown in FIG. 14B, below.

The dynamic content 230 supplied by the content curator 142 at a first point in time (shown as Time 1) and can include a variety of content formats, such as text-based content, video-based content, image-based content, and so forth. Upon providing the dynamic content 230, the content management system can identify the text-based content 232 and translate it into translated content 234 using the translation module 132. As shown, the translated content 234 can include a plurality of different translations, shown as 234A, 234B, 234C, with each translation being in a different language or dialect. The text based content 232 and the translated content 234 can be stored in the content database 126.

At a later point in time (shown as Time 2), the dynamic content 230 associated with the trigger 202 can be updated by the content curator 142. The updated text-based content 236 can then be translated to generate updated translated content 238. As illustrated, the updated translated content 234 can include the plurality of different translations, shown as 238A, 238B, 238C. It is noted that the trigger 202 originally linked to the dynamic content 230 does not need to be altered when the linked dynamic content 230 is updated.

When determining which dynamic content 230 to deliver in response to a trigger 202, the content management system 100 can rely on additional information received from the mobile communications device. For example, metadata received along with the trigger 202 from a mobile communications device can be processed to determine which dynamic content 230 should be delivered to the mobile communications device. The metadata can include, without limitation, geographic data, demographic data, user equipment data, and so forth.

Figure 3A:
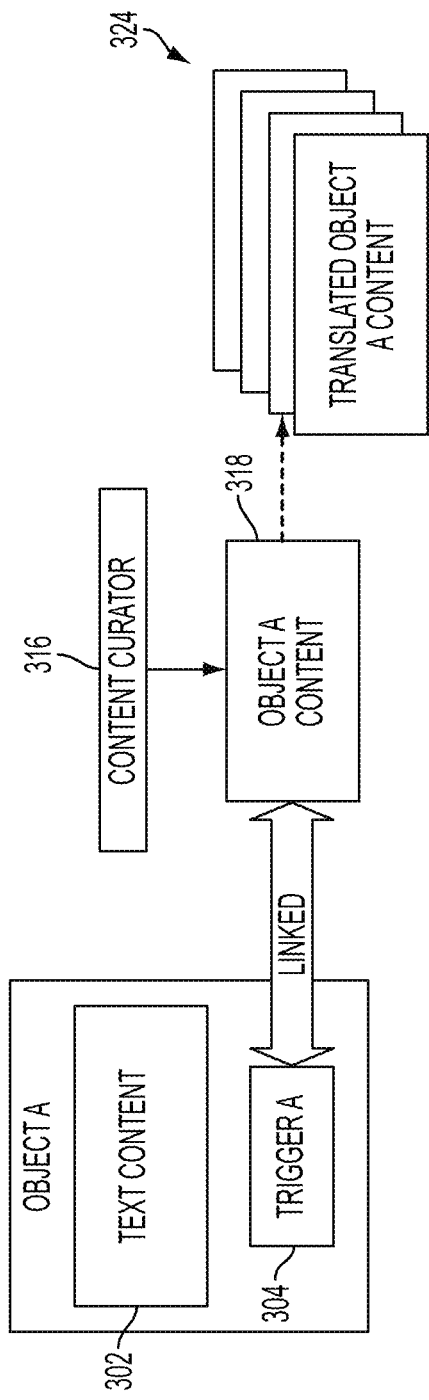
FIGS. 3A-3D depict example types of objects that are each associated with a trigger.
Figure 3B:
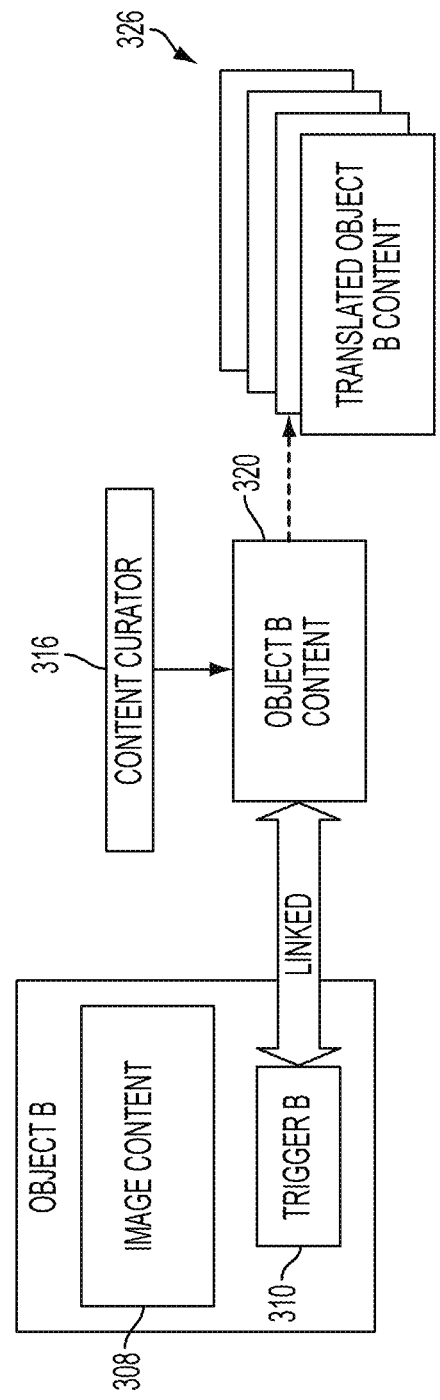
Figure 3C:
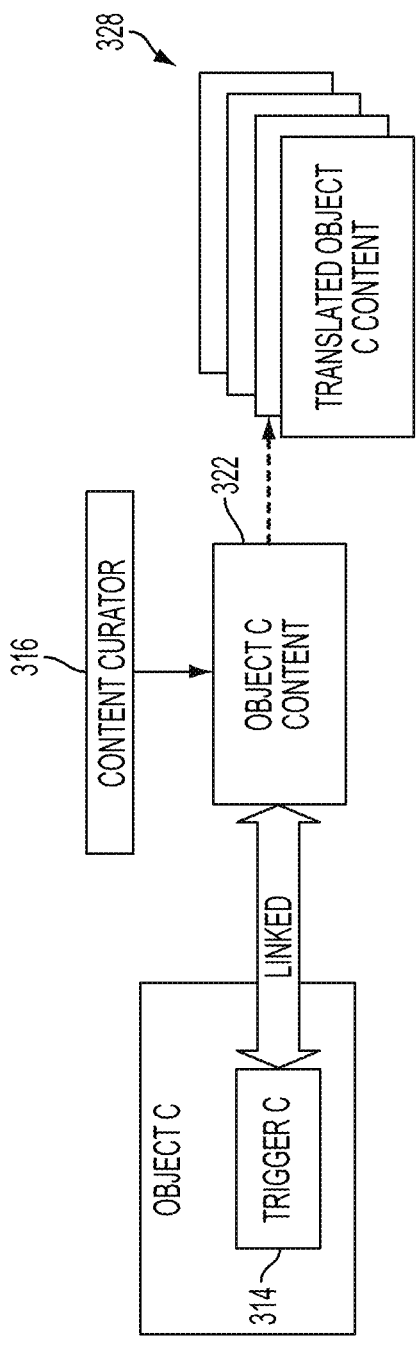

FIGS. 3A-3C depict example types of objects that are each associated with a trigger. Referring first to FIG. 3A, an object A is a physical object that includes text content 302. Object A can be, for example, a menu, a sign, an advertisement, packaging, a document, a nametag, or any other object that includes text content 302. A trigger 304 is coupled to, or otherwise associated with, the object A. As illustrated, the trigger 304 is linked to object A content 318 that has been provided by a content curator 316. The object A content 318 can be substantially identical to the text content 302, or at least related to the text content 302. In the example of a menu, the text content 302 can be printed in a first language and list the meals available at a restaurant. The object A content 318 stored by the system can include descriptions of the meals, as provided by the content curator (i.e., the restaurant). The translated object A content 324 can include the descriptions of the meals translated into a number of different languages. If a person dining at the restaurant cannot read the first language, the person can transmit the trigger 304 to the content management system 100 (FIG. 1) and receive translated object A content 324.

The object associated with a trigger does not necessarily have to include text content. Referring now to FIG. 3B, object B is a physical object that includes image content 308. Object B can be for example, a piece of art in a museum. A trigger 310 is coupled to, or otherwise associated with, the object B. As illustrated, the trigger 310 is linked to object B content 320, which has been provided by the content curator 316. The object B content 320 can be related to the image content 308. Translated object B content 326 can also be associated with the trigger 310. In the example of a piece of art, the object B content 320 can include an artist biography, a history of the piece, or any other related information. The translated object B content 326 can include the descriptions of the piece of art translated into a number of different languages. A person viewing the piece of art at the museum can transmit the trigger 310 to the content management system 100 (FIG. 1) and receive translated object B content 326. As described in more detail below, in some embodiments, the trigger 310 can be based on mobile visual search (MVS) technology. For instance, a user can take a picture of the piece of art, and the picture can serve as the trigger for the content management system.

The object associated with a trigger does not necessarily have to include image or text content, nor does the object have to be a physical object. Referring now to FIG. 3C, object C is a non-physical object, such as a geographical based location. A trigger 314, such as a latitude and longitude or general geographic region is associated with the object C. As illustrated, the trigger 314 is linked to object C content 322 that is provided by the content curator 316. The object C content 322 can be related to the non-physical object. Translated object C content 328 can also be associated with the trigger 314. In the example of a geographical based location, the object C content 322 can include information related to that particular geographical location. The translated object C content 328 can include the descriptions of that particular location translated into a number of different languages. A person standing at a certain location, such as proximate to a landmark, can transmit the trigger 310 (i.e., their location) to the content management system 100 (FIG. 1) and receive translated object C content 328 related to that landmark. In some embodiments, the users can supply user-supplied location-based content to the content management system 100. Such user-supplied location-based content can subsequently be provided to users by the content management system 100 (FIG. 1) who transmits the associated trigger.

Figure 3D:
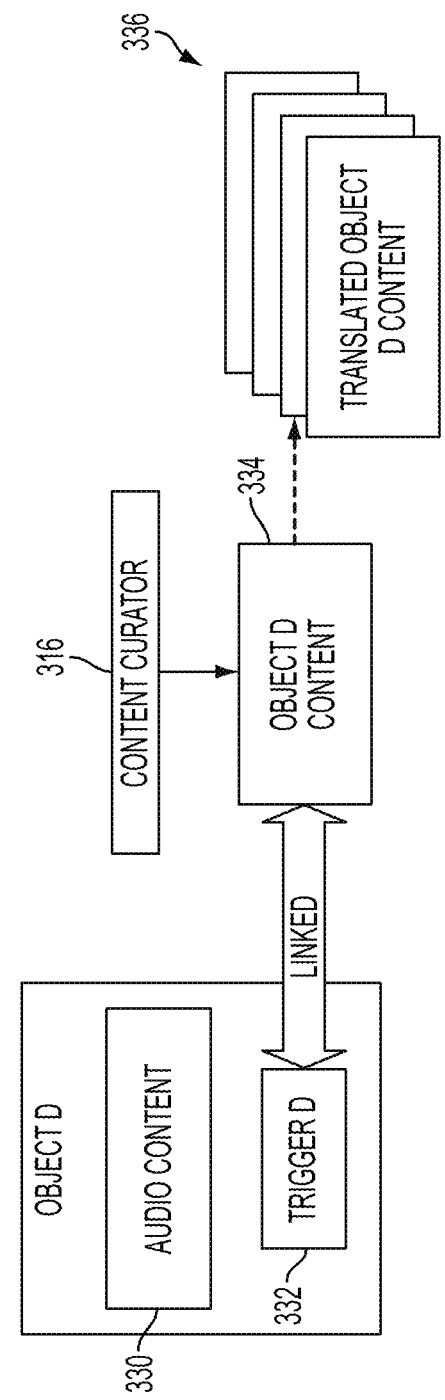

Referring now to FIG. 3D, object D is a non-physical object that includes audio content 330. Object D can be for example, a song, the audio portion of a commercial, movie, or television show, a radio advertisement, or any other audio-based medium. A trigger 332 is associated with the object D. The trigger 332 can be an acoustic code, such as an acoustic fingerprint technology (AFT) code. As illustrated, the trigger 332 is linked to object D content 334, which has been provided by the content curator 316. The object D content 334 can be related to the audio content 330. Translated object D content 336 can also be associated with the trigger 332. In the example of a song, the object D content 332 can include song-related information, such as artist information or purchasing information. The translated object D content 336 can include the song-related information translated into a number of different languages. A user listening to the audio content 330 can transmit the trigger 332 to the content management system 100 (FIG. 1) and receive the translated object D content 336 that is associated with the song.

Figure 4:
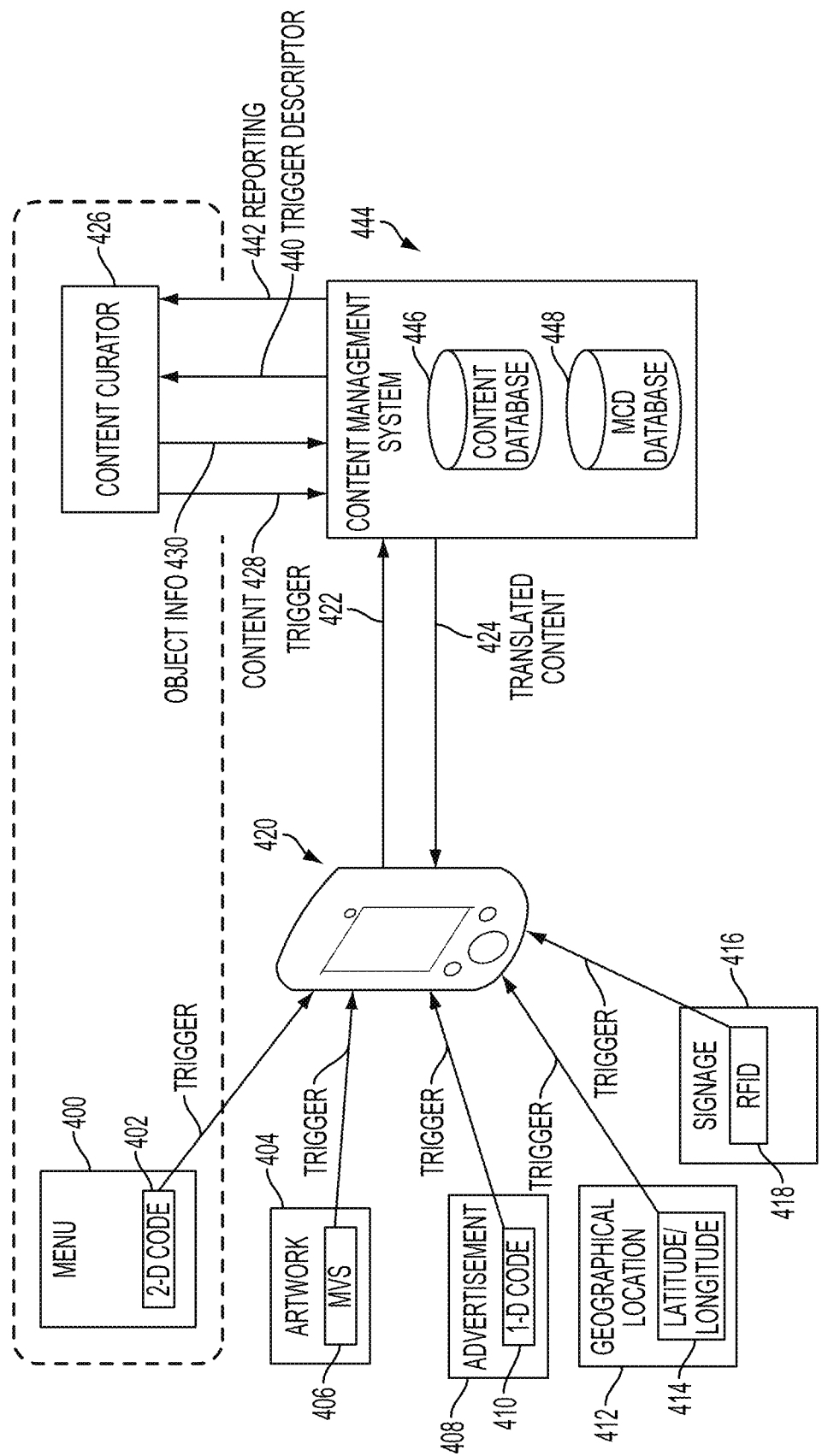
FIG. 4 schematically depicts example interactions between a mobile communications device, a content management system, and a content curator.

FIG. 4 schematically depicts example interactions between a mobile communications device 420, a content management system 444, and a content curator 426. While the mobile communications device 420 is illustrated as a smart phone, it is to be readily appreciated that any suitable mobile communications device can be utilized, such as a table computer, a wearable device, and so on. A content curator 426 can supply the content management system 444 with content 428 through any suitable user interface (see FIG. 13, for example). Information regarding the mobile communications device 420 in communication with the content management system 444 can be stored in a mobile communications device database 448.

In the example of menu 400, the content 428 can include descriptions of dishes, ingredients, pictures of the dish, and so forth. In some embodiments, the content curator 426 can also supply additional information, generally referred to as object information 430, which relates to the object but is not necessarily intended to be transmitted to a user. Upon providing the content 428 to the content management system, a trigger descriptor 440 is provided to the content curator 440. In the illustrated example, the trigger descriptor 440 is a graphic file of the two-dimensional code 402. The content 428 supplied by the content curator 426, and associated translations of the content 428, can be stored in a content database 446 associated with the content management system 444. In accordance with various embodiments, the content management system can track, or otherwise monitor, the interactions between various triggers and various mobile communications device. Data related to these interactions can be provided to the content curator 426, or other interested parties, through reporting 442.

The content curator 426 can subsequently associate the two-dimensional code 402 with the menu 400. The association can be made using any suitable technique, such as printing the two-dimensional code directly onto the menu 400, placing a sticker with the two-dimensional code 402 on the menu 400, or otherwise including the two-dimensional code 402 on a menu insert or advertisement, for example. A person having difficulty reading the menu 400 can obtain the two-dimensional code 402 using a scanner (such as a camera) on their mobile communications device 420. As illustrated, this two-dimensional code 402 is sent to the content management system 444 as a trigger 422. Upon receipt of the trigger 422, translated content 424 is provided to the mobile communications device 420. In the example of the menu 400, the translated content 424 can include written descriptions of dishes and ingredients translated into the user's preferred language.

FIG. 4 also depicts example interactions with other static objects that ultimately result in the receipt of dynamic content associated with the static object. Referring now to artwork 404, a mobile visual search code 406 is associated with the piece of art. A user of the mobile communications device 420 can take a picture of the artwork 404 and a visual search engine can use the picture as an input. Once the image picture is identified by the visual search engine, the identified picture can serve as the trigger 422 for the content management system 444. Then content management system 444 can cross-reference the trigger 422 to associated content in the content database 446 and supply translated content 424 to the mobile communications device 420. As is to be readily appreciated, the utilization of a mobile visual search code 406 is not limited just to works of art. Instead, images of a wide variety of objects can be linked to content stored by the content management system 444.

Advertisement 408 is yet another embodiment of a static object that is associated with a trigger, which is illustrated as a one-dimensional barcode 410. Content relevant to the advertisement 408 is stored within the content database 446. When the mobile communications device 420 provides the trigger 422 to the content management system 444, translated content 424 associated with the advertisement can be provided to the mobile communications device 420. As is to be appreciated, the advertisement 408 can be fixed content, such as a printed poster advertising a playhouse. The virtual content associated with the printed poster can be routinely updated to reflect upcoming show times, performances, and so forth. Thus, the dynamic content sent to mobile communication device 420 based on a transmission of the one-dimensional code 410 can include up-to-date information. In some embodiments, the advertisement 408 may be for a retail establishment or restaurant, and a user of the mobile device 420 can transmit the one-dimensional trigger 410 to receive deals, offerings, or coupons from the retail establishment or restaurant. The particulars of the deals, offerings, or coupons can be updated by the content curator 426 over time.

It is noted that in some embodiments, two physical objects, such as two advertisements 408 may be associated with an identical trigger 410 (such as an identical barcode, for example). Nevertheless, the content management system 444 can still be configured to dispatch different content to different mobile communications device that transmit the trigger 410. For example, metadata accompanying the trigger 410 can indicate the physical location (i.e., GPS coordinates) of the mobile communications device 420. Using this physical location, the content management system 444 which virtual content to dispatch to the requesting device, as established by the content curator 426. Thus, a user scanning a trigger 410 while standing outside a movie theater in Los Angeles can receive different content than a user scanning the same trigger 410 while standing outside a movie theater in New York. The physical location of the user transmitting the trigger 410 can also be relevant in other implementations. When the translated content 424 delivered to the mobile communications device 420 includes walking or driving directions that are based on the actual location of the mobile communications device 420, the physical location of the mobile communications device 420 can be used to determine which directions to transmit for the user to follow.

Still referring to FIG. 4, geographical location 412 depicts an example of associating a geographical-based trigger, such as a longitude/latitude code 414, to a particular location or region. When the longitude/latitude code 414 is sent to the content management system 444 as a trigger 422, the content management system 444 can cross-references the longitude/latitude code 414 to content supplied by the content curator 426 that is associated with that particular location or a geographic region (sometimes referred to as "geo-fencing"). If the longitude/latitude code 414 indicates the user is physically located within a predefined area, translated content 424 linked to that predefined area can be sent to the mobile communication device 420.

Some embodiments can utilize wireless, non-contact system that use radio-frequency electromagnetic fields to transfer data from a tag attached to an object, such as signage 416 or any other suitable object. Upon receiving information from an RFID tag 418, such as by polling the RFID tag 418 with an electromagnetic field; the mobile communications device 420 can pass the information along to the content management system 444 as a trigger 422. Similar to the previous embodiments, the contentment management system 444 can determine what content in the content database 446 is associated with that particular trigger 422 and supply translated content 424 to the mobile communications device 420. As is to be appreciated, any contactless transaction can be used to transmit data associated with the object to the mobile communications device. Suitable wireless non-contact communications systems can be utilized, such as near filed communication (NFC) technology, Bluetooth® technology, or other suitable transmission technologies. Additional details regarding non-contacting communication technologies are discussed in more detail below.

It is noted that various codes presented in FIG. 4, such as two-dimensional code 402 and one-dimensional barcode 410, do not necessarily have to be embodied in a printed medium. The code can be displayed using any suitable presentment medium, such as displayed on any type of video screen or projected on a surface, for example.

Figure 5:
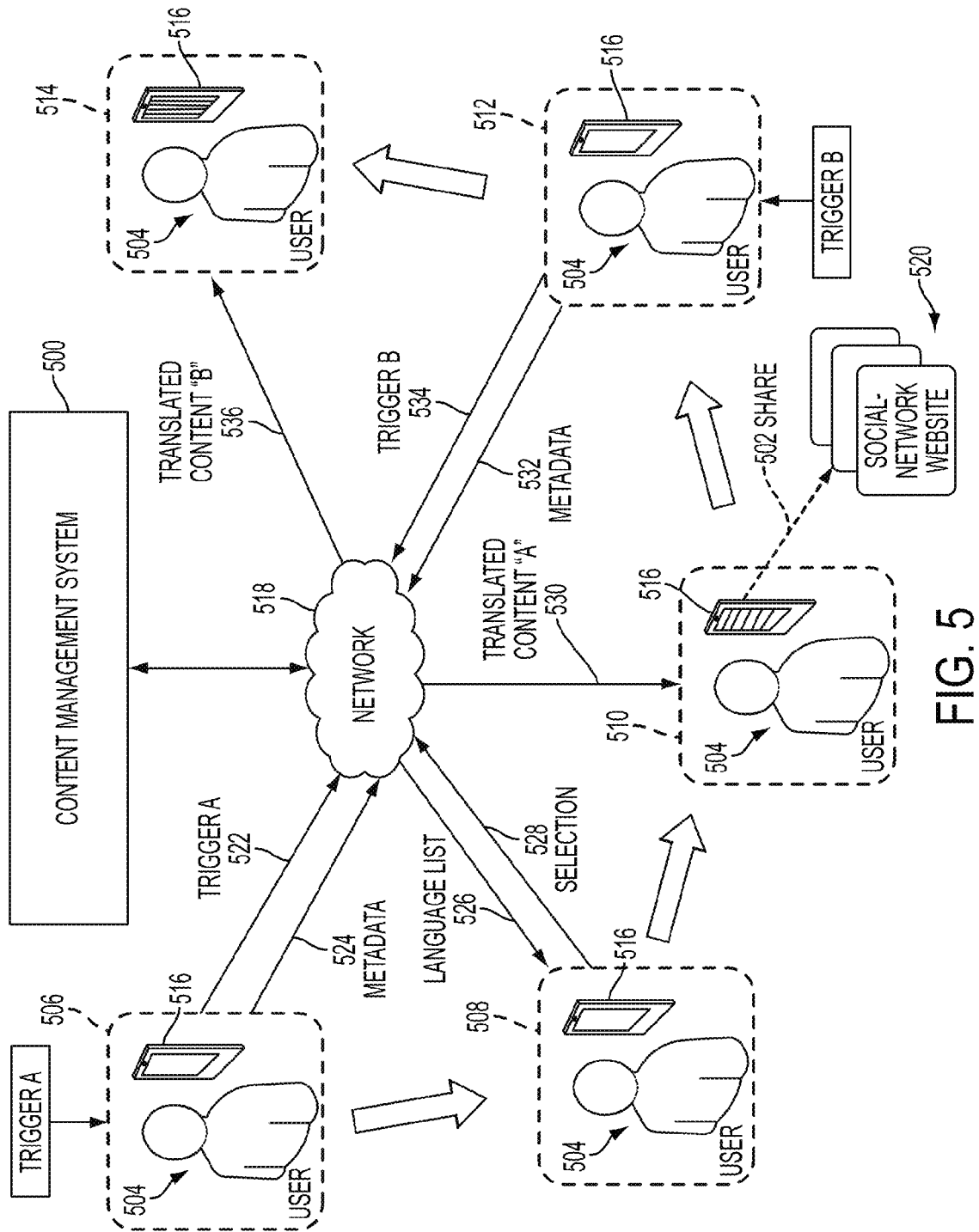
FIG. 5 depicts a series of example interactions by a user with a content management system over time.

FIG. 5 depicts a series of interactions by a user 504 with a content management system 500 over time. At 506, the user 504 encounters trigger A. Using a mobile communications device 516, the user 504 supplies trigger A 522 to the content management system 500 via the network 518. As illustrated, the content management system 500 can generally communicate with the network 518 via a series of network communications 538. The mobile communications device 516 can also supply metadata 524 to the content management system 500. The metadata 524 can be used by the content management system 500 to recognize the mobile communications device 516 during subsequent interactions. The particular form of the metadata 524 can vary based on how the trigger is supplied to the content management system 500. For triggers supplied by a text message, a mobile telephone number associated with the mobile communications device 516 can be included in the metadata. For triggers supplied by a web browser, a cookie associated with a browser of the mobile communications device 516 can be included in the metadata.

At 508, a language list 526 is sent to the mobile communications device 516 by the content management system 500. The language list 526 can identify all of the different languages in which content can be delivered to the mobile communications device 516. Alternatively, the language list 526 can merely identify a subset of all of the different languages in which content can be delivered. The particular languages in the subset can be determined, for example, based on an identifier that was received from the mobile communications device. The identifier can be included in the metadata 524 and can be, for example, a country code or other type of geographic identifier, a telephone number, or an IP address. The language list 526 can be presented to the user of the mobile communications device 516 in any suitable format, such as within a text message, with a browser window, and so forth. In any event, the user 504 can select one of the languages and provide the selection 528 to the content management system 500. Examples of language list presentment and selection are shown below in FIGS. 12A-12B.

At 510, the translated content "A" 530 is transmitted to the mobile communications device 516 by the content management system 500. The translated content "A" 530 is the content associated with Trigger A that has been translated into the language that was indicated by the selection 528.

As with many of the embodiments described herein, the user 504 can be presented with the option to "share" 502 the translation content "A" to social-networking websites 520 that are associated with the user 504. Example social-networking websites can include, without limitation, Facebook®, Twitter®, LinkedIn®, MySpace®, Pinterest®, and Google+®. The particular content shared to the social-networking website can be displayed on that website in the translated language, as associates of the user 504 on the social-networking website are likely speak the same language as the user 504. Nevertheless, the content shared to the social-networking website can also include a hyperlink to the content management system 500 through which the associates can seek additional translations of the content.

The sharing 502 can be functionally implemented using any suitable technique known in the art, such as by including a "share this" icon on a webpage that is sent to the mobile communications device 516 by the content management system 500. Upon activation of the "share this" icon, the user 504 can select which particular social-networking website(s) to which the translation should be shared. As with other interactions with the content management system 500, the user's activity with regard to pushing content to social-networking websites 520 can be stored by the system for analytics purposes.

At 512, the user 504 encounters trigger B. Using the mobile communications device 516, the user 504 supplies trigger B 534 and metadata 532 to the content management system 500 via the network 518. Based on the metadata 532, the content management system 500 is able to identify the mobile communications device 516 and determine that the user 504 has supplied a preferred language via the previous language selection 528.

At 514, the translated content "B" 536 is transmitted to the mobile communications device 516 by the content management system 500. The translated content "B" 536 is the content associated with Trigger B and is translated into the language that was indicated by the selection 528.

In accordance with various embodiments, the system and methods described herein can be used for multi-language, real-time messaging between users who do not necessarily speak the same language. FIG. 6 depicts an example multi-language messaging session between two users that is coordinated by a content management system 600. In the illustrated embodiment, a first user 602 prefers language A while the second user 626 prefers language B and a trigger 632 is associated with the second user 626. The trigger 632 can be physically associated with the second user 626 using any suitable technique, such as via a barcode printed on a name tag or an RFID tag coupled to a business card, for example. Alternatively, the trigger 632 may not necessarily be physically associated with the second user 626. Instead, the trigger 632 can provided to the first user 602 via a sign in a hotel room, a brochure, or any other suitable form of communication. In any event, once the first user 602 determines they wish to communicate with the second user 626, the first user 602 can transmit the trigger 608 to the content management system 600 using their mobile communications device 604. The first user 602 can also transmit a message 1 in language A 610. Message 1 can be typed, for example, using an onscreen keyboard 606 that includes the characters necessary to communicate in language A.

The content management system 600 receives the trigger 608 and determines that the trigger 608 is associated with the second user 626. Based on a language preference of the second user 626 (which is language B in the illustrated embodiment), the message 1 can be translated into language B in substantially real-time. In one embodiment, a translation module 634 is utilized for the translation functionality. The content management system 600 then transmits the message 1 that has been translated into language B 612 to the mobile communications device 628 of the second user 626.

Upon receiving the message from the first user 602, the second user 626 may wish to respond. Using an onscreen keyboard 630, which can include the characters necessary to communicate in language B, the second user 626 can type a message in language B 614 and send it to the content management system. Upon translation of the message from language B to language A, the content management system 600 can transmit the message 2 in language A to the mobile communications device 604 of the first user 602. Since the communications channels have been established between the first user 602 and the second user 626, the two users can communicate in substantially real-time. As shown, message 3 is provided by the first user 602 in language A and the content management system 600 translates the message into language B prior to transmitting the message to the mobile communications device 628 of the second user 626. It is not necessary to re-transmit the trigger 608 in order to maintain the communication channel between the first user 602 and the second user 604.

Figure 7:
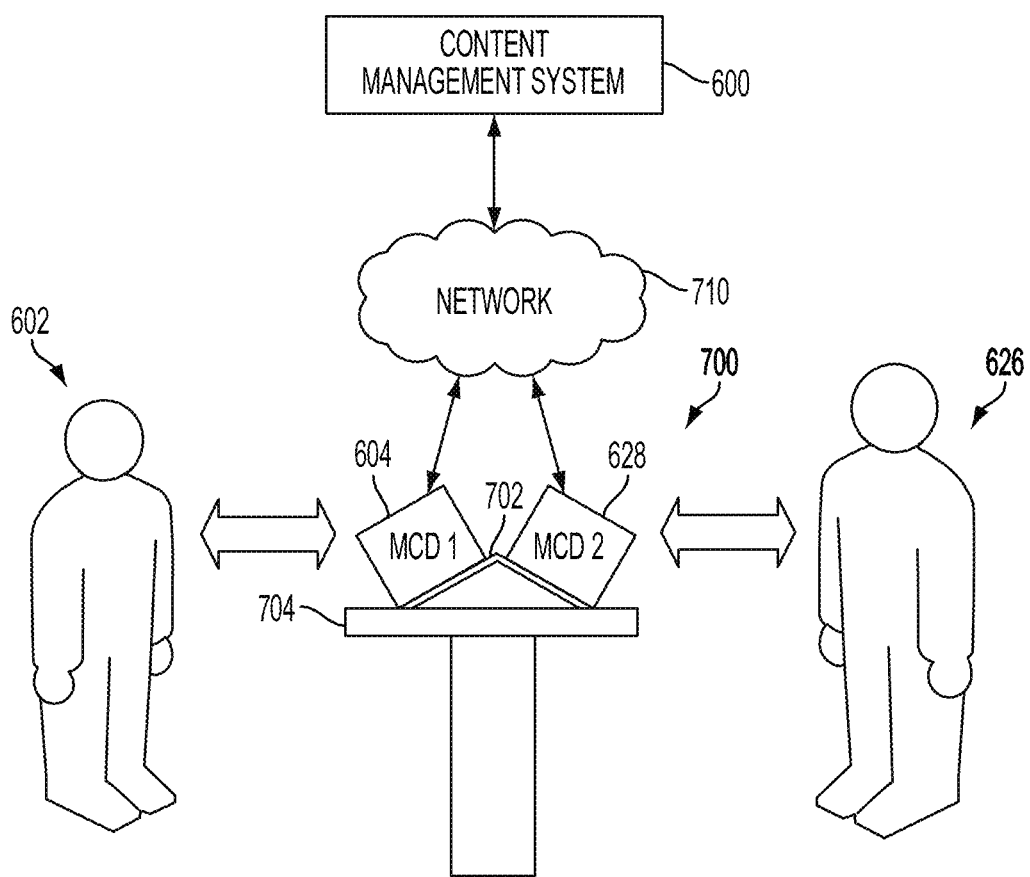
FIG. 7 depicts two users interacting with an example translation station, which is in communication with a content management system.

Referring to FIG. 7, in some embodiments, the mobile communications device 604 and the mobile communications device 628 can be positioned in close proximity in an arrangement that can be used as a "walk-up" translation station 700. In one embodiment, the translation station 700 comprises a frame 702 that supports the two mobile communications device 604, 628 in a generally opposed position. As is to be readily appreciated, however, some embodiments will not utilize a frame 702, or will otherwise maintain the two mobile communications device 604, 628 in different relative positions. In one embodiment, the mobile communications devices 604, 628 are tablet computers, although any suitable type of mobile communications device can be used without departing from the scope of the present disclosure. In the illustrated embodiment, the translation station 700 is positioned on a desktop 704. The translation station 700 can be used in a variety of operational environments, such as at hotel front desks, customer service centers airports, train stations, and so forth. As illustrated, the first user 602 can walk up to an engage with the mobile communications device 604 and select a preferred language. The onscreen keyboard 606 can display a character set for the selected language (illustrated as "language A" in FIG. 6). The first user 602 can type a message in language A via the virtual keyboard 606. The message can be sent to the content management engine 600 through the network 710. The content management system 600 can receive and process the message. The message can be translated in substantially real-time into language B. The translated message can then be sent to and displayed on the mobile communications device 628. The second user 626 (such as a hotel employee, for example), can reply to the message by typing a message using the mobile communications device 628. The message can be typed using an onscreen keyboard 630 that displays a character set for the language associated with the second user 626 (illustrated as "language B").

Figure 8:
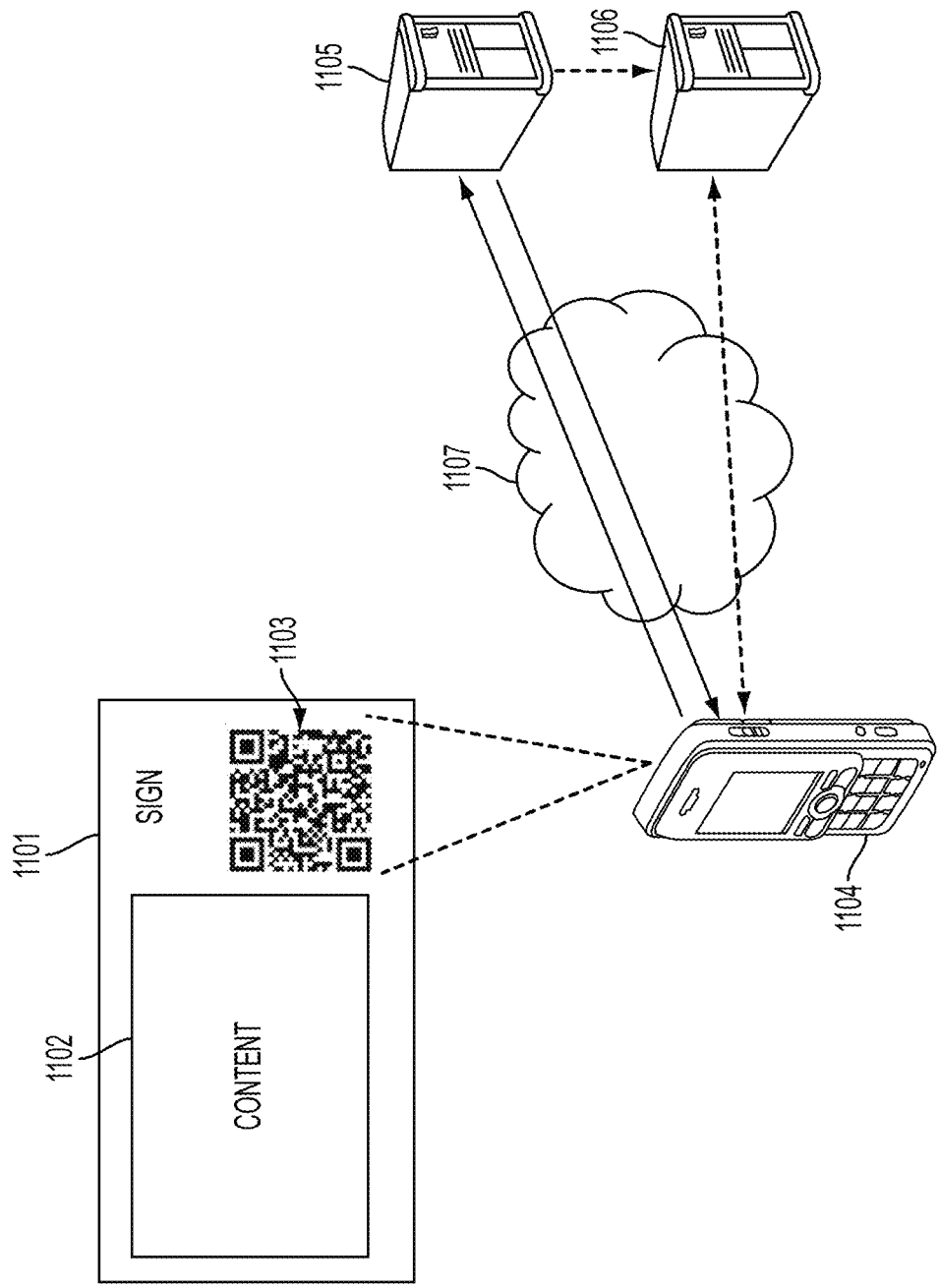
FIG. 8 depicts an exemplary system diagram for translating visual indicia.

FIG. 8 depicts an operational example of another content management system in accordance with one non-limiting embodiment. An exemplary sign 1101 is illustrated containing content 1102 that is visually and/or audio-visually displayed. Content 1102 can be an advertisement, text, one or more images, a map, directions, a video display, and the like. Sign 1101 also includes a 2D code 1103, which, in this example, comprises a QR Code. It is to be understood by those skilled in the art that multiple 2D codes may be used, depending on the configuration and needs of the designer. As mentioned above, the amount of data contained in the QR code may vary, depending on the character set, version and error correction level. The following provides some exemplary configurations of QR codes:

Version 1—21×21, 10-25 alphanumeric characters
Version 2—25×25, 20-47 alphanumeric characters
Version 3—29×29, 35-77 alphanumeric characters
Version 4—33×33, 50-114 alphanumeric characters
Version 10—57×57, 174-395 alphanumeric characters
Version 40—177×177, 1,852-4,296 alphanumeric characters In one embodiment, QR Code 1103 contains a representation of content 1102, e.g., any text contained in the content and/or image description. Additionally, QR code 1102 may contain location information and other data relating to content 1102. For example, if sign 1101 is displayed at an event, the event information may be encoded as well. In one embodiment, a language code is included to designate the language in which the content is presented. Further details may be found below in connection with FIG. 10.

When the QR Code is scanned by the mobile communications device 1104, the content may be displayed as text, or may open a Uniform Resource Identifier (URI), or compose an e-mail or text message. QR codes may also contain addresses and Uniform Resource Locators (URLs) to hardlink (also referred to as "object hyperlinking") and connect mobile communications device 1104 to a network 1107. In one embodiment, scanning of QR Code 1103 generates a Hyper Text Markup Language (HTML) page on device 1104. As is known in the art, HTML is a markup language that is a set of markup tags that is used by HTML to describe web pages. The HTML form is opened in a web browser. When opened, data relating to content 1102 is presented on mobile communications device 1104. In this example, the data may be related to text or other content that is in a language that is not understood by user of device 1104. In this case, the browser provides a language selection list that allows the user to select a language that is more familiar to the user. When the new language is selected, the page is transmitted through network 1107 to server 1105, which automatically translates the content (or retrieves translated content from a database) and transmits the translation (preferably as an HTML page) back to device 1104.

Under an alternate embodiment, mobile communications device 1104 browser can execute a URI redirection, allowing the QR code to send metadata to existing applications on the mobile communications device 1104. In cases where smaller groups of users are contemplated, a predetermined number of recognized languages can be "pushed" to mobile communications device 1104, together with a data set containing the known content of signs in a given area. In this instance, translation of content can be performed on the mobile communications device 1104, without using significant network resources.

Under another embodiment, server 1105 can be communicatively coupled to one or more other servers 1106 that provide additional content relating to information obtained from QR Code 1103. For example, server 1106 can provide information to mobile communications device 1104 regarding other users detected in the area that speak the native language of the original user, as well as the language that was requested for translation. In another example, server 1106 can provide HTML pages containing the translated content of neighboring signs in a given area. When the QR Codes, or other types of triggers, from the neighboring signs are scanned, the translated content is immediately presented to the user. It is understood that the functionalities of servers 1105 and 1106 may be combined in a single server as well.

Figure 9:
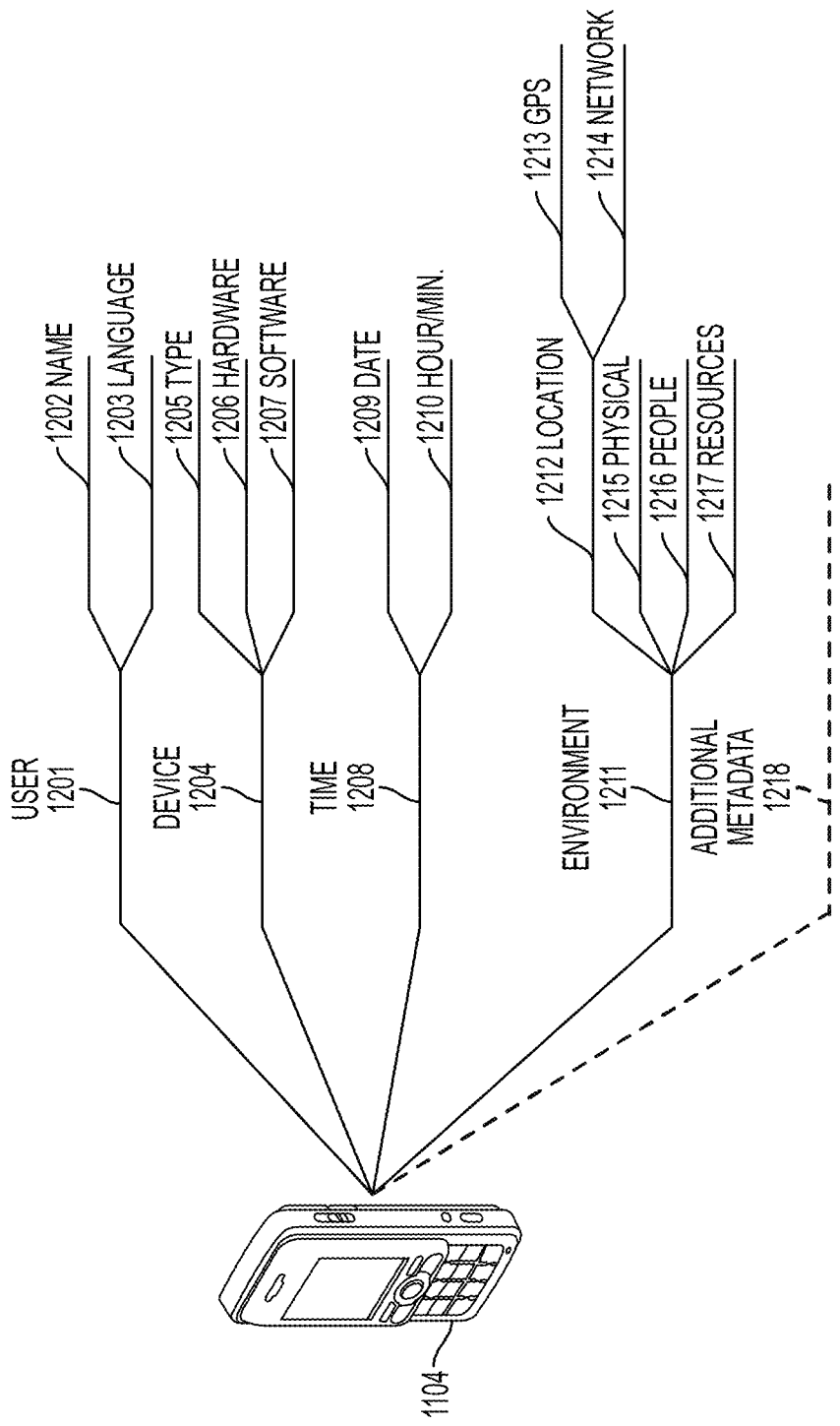
FIG. 9 depicts an exemplary mobile communications device configuration for the embodiment of FIG. 8.

Turning to FIG. 9, information, sometimes referred to at metadata, pertaining to device 1104 can be collected and transmitted along with a trigger. The device information can be transmitted with each trigger, or can alternately be sent at predetermined times, or upon the detection of a specific event (e.g., device detected in a specific location, or connected to a wireless network). Here, any of data sets pertaining to user 1201, the device 1204, time 1208 and environment 1211 can be transmitted at given times, or can be provided after a user has registered with a web site or other network-based provider. For example, the user's name 1202 can be collected after an initial registration. Language preferences 1203 can be entered, providing information on native language(s), language proficiencies, and/or frequently encountered languages for translation. By entering frequently encountered languages for translation, the content management system can advantageously translate content automatically without requiring additional input from the user. As illustrated, a wide variety of other types of metadata can also be transmitted along with the trigger, as indicated by additional metadata 1218 in FIG. 9.

For device information 1204, the type of device 1205, hardware 1206 and software 1207 can be included as well. This information can assist the content management system to provide data back to device 1104 in a format that is compatible. Time data 1208 includes a time stamp or code that indicates the date 1209, hour and minute 1210 when the device is requesting a translation request, or for other purposes. Environment data 1211 includes data pertaining to device 1104's location 12112, which can be determined from GPS 1213 or from a connection to a specific network 1214. Physical data 1215 relates to the physical surrounding of device 104, which can include temperature, ambient noise, or accelerometer measurements, which would indicate whether the user is stationary or moving. People data 1216 relates to other users such as personal and/or business contacts; in the event device 1104 is equipped with social media software, similar lists (e.g., "friends") could be included. Resources data 1217 relates to data and/or voice networks being accessed or are accessible to device 1104. Resource data 1217 can be useful in determining when and how communication can be made with device 1104.

Figure 10:
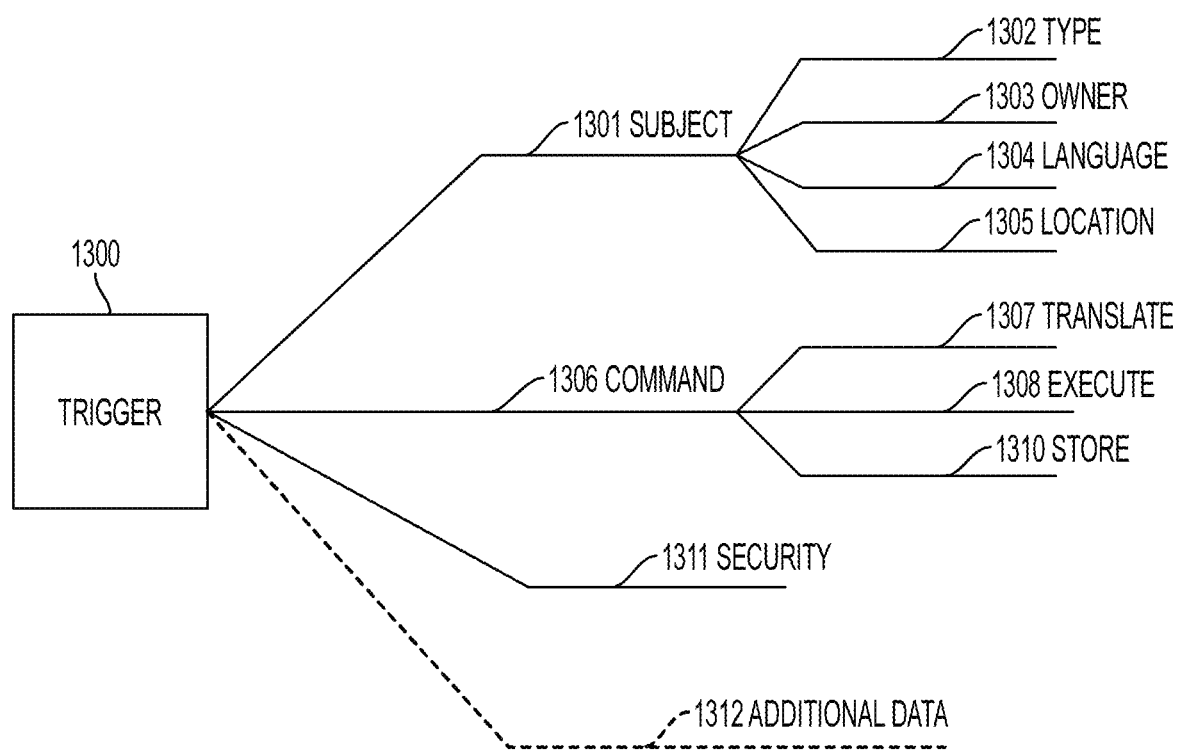
FIG. 10 depicts an example trigger arrangement of the exemplary embodiment.

Turning to FIG. 10, an exemplary configuration for trigger 1300 is illustrated. The trigger 1300 can be the QR Code discussed above in connection with FIG. 8, or any other suitable code. The data structure of trigger 1300 can take any of a number of forms. In the example of FIG. 10, trigger 1300 comprises data relating to the subject 1301 of content, command codes 1306 that are capable of causing device 1104 to execute specific functions, and security 1311. As illustrated, a wide variety of other types of data can be included in the data structure of the trigger 1300, as indicated by the additional data 1312 in FIG. 10.

Subject data 1301 can comprise data relating to a type of content 1302, such as an advertisement, road sign, meeting placard, or the like. Owner 1303 information can indicate one or more underlying subjects affiliated with content. For example, a display for "XYZ Services" provided by "ABC Corporation" at "The 123 Convention" can contain any or all of this information in the 2D code. This information can be subsequently used for tailoring translations and/or providing additional content as described above. Language data 1304 indicates the language in which the content was presented. Under an alternate embodiment, language data 1304 can also include one or more languages that are statistically linked for translation from the native language. For example, if content is presented in English, a link to the Spanish and French languages can be placed within the code. Such a configuration would be advantageous for an automatic "default" translation template for use in North America. Location data 1305 includes information relating to the physical location where the content is displayed or presented.

Command data 1306 includes information allowing device 1104 to execute specific functions. The command data 1306 can be incorporated into code 1300, but can also be transmitted separately via commands entered by a user. In one embodiment, commands comprise an alphanumerical code that is read out and compared to a look-up table for determining a specific function to be executed on the device. Translate data 1307 signifies the code as containing information suitable for translation. Execute data 1308 signifies a command that involves running one or more application on the device.

Store code 1310 provides the option of storing a decoded code, or a representation of the code (e.g., an image of the actual code). This function advantageously allows a device to postpone transmission in the event that no network connections are available. Security 1311 relates to any security and/or encryption that can be desired for code 1300.

Figure 11:
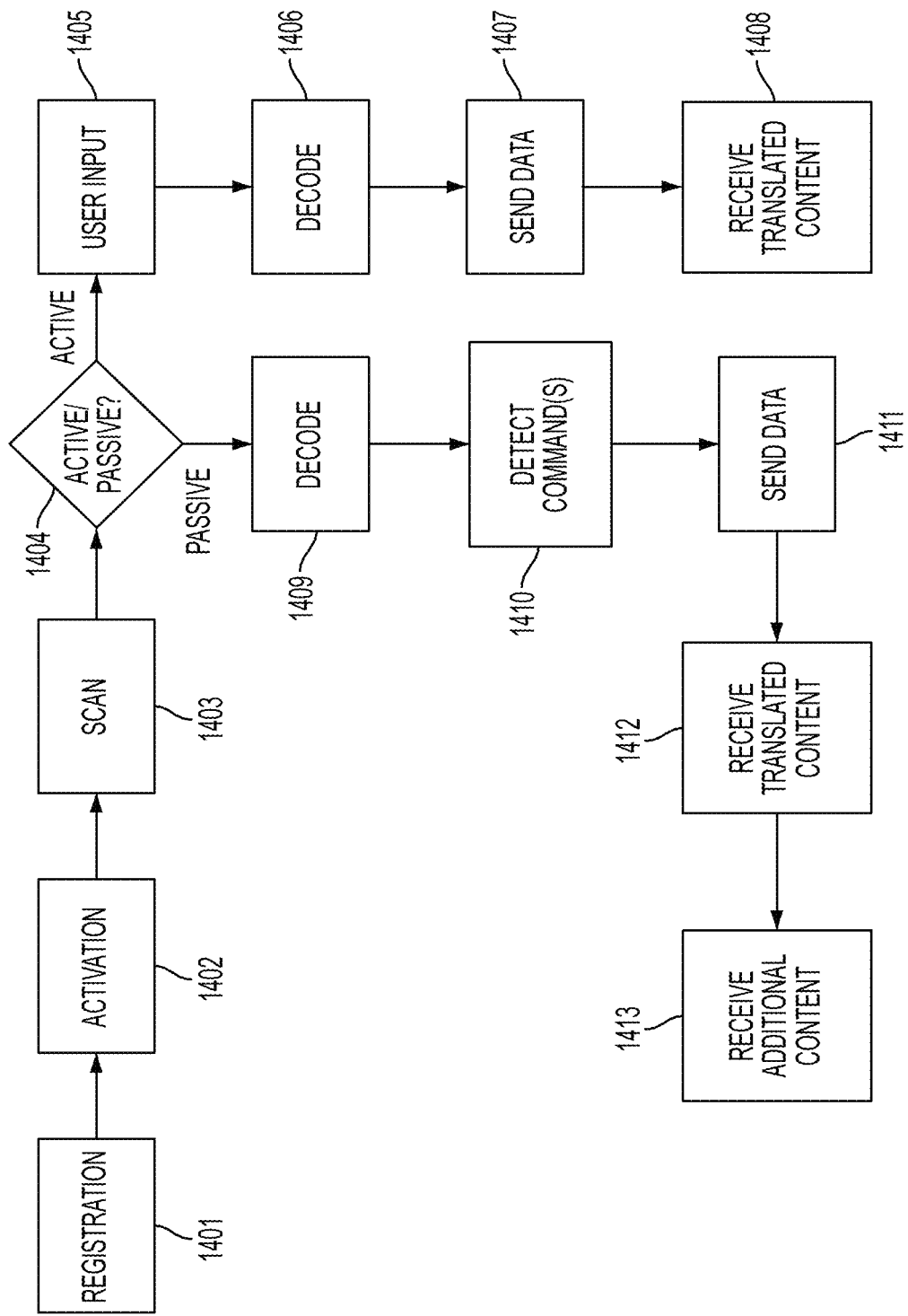
FIG. 11 depicts an example flow chart showing a process for the capture of a trigger and subsequent translation.

FIG. 11 illustrates an exemplary process for actively and/or passively capturing a trigger for translating content to a different language using real-time translation. In step 1401, a user's mobile communications device is registered, where the user's name and language data is entered into a computer database. Additionally, items such as demographic data, location data, data format preference information, and other information pertaining to the user can be entered as well. In some embodiments, such information can be maintained via a user account. As is to be appreciated, however, the use of a registration step 1401 is merely exemplary, as registration with the system is not required for many embodiments described herein. In step 1402, the user's device activates a software application associated with a content management system. The activation may occur automatically, or may be remotely activated from a server associated with the code translation software.

In step 1403, the device scans a trigger, which is a two-dimensional code in this embodiment. At 1404, it is determined if code translation software is in an "active" or "passive" mode. When the code translation software is in "active" mode, the device requires a user input 1405 to facilitate the decoding and translation of the two-dimensional Code 1406. When the two-dimensional Code information is obtained from the decoding process, the information can be transmitted 1407 to a remote server for translation. During an "active" translation process, the user can additionally provide user input, such as a selection from a menu or drop-down screen, to provide further instruction for translation. As an example, a user can scan a two-dimensional code associated with a sign printed in English. After pressing a "translate" icon on the screen, the user then selects "French" from a menu that will serve as instruction for the content in the two-dimensional code to be translated into the French language. After the content is transmitted out in 1407, the server can performs machine translation on the text and transmits it back, where it is received 1408 in the device.

When the code translation software is in "passive" mode, the device requires little to no input from the user, and the process is performed automatically. After a two-dimensional code is scanned, the device automatically decodes 1409 the code and extracts the content. Next, the software detects commands 1410 that may be present and/or interpreted from the decoded information, and automatically sends the data in 1411. After a remote server receives the data, it performs machine-based translation and transmits the translated content back to the device 1412. In the embodiment of FIG. 11, additional content 1413 (discussed above) may also be received.

Figure 12B:
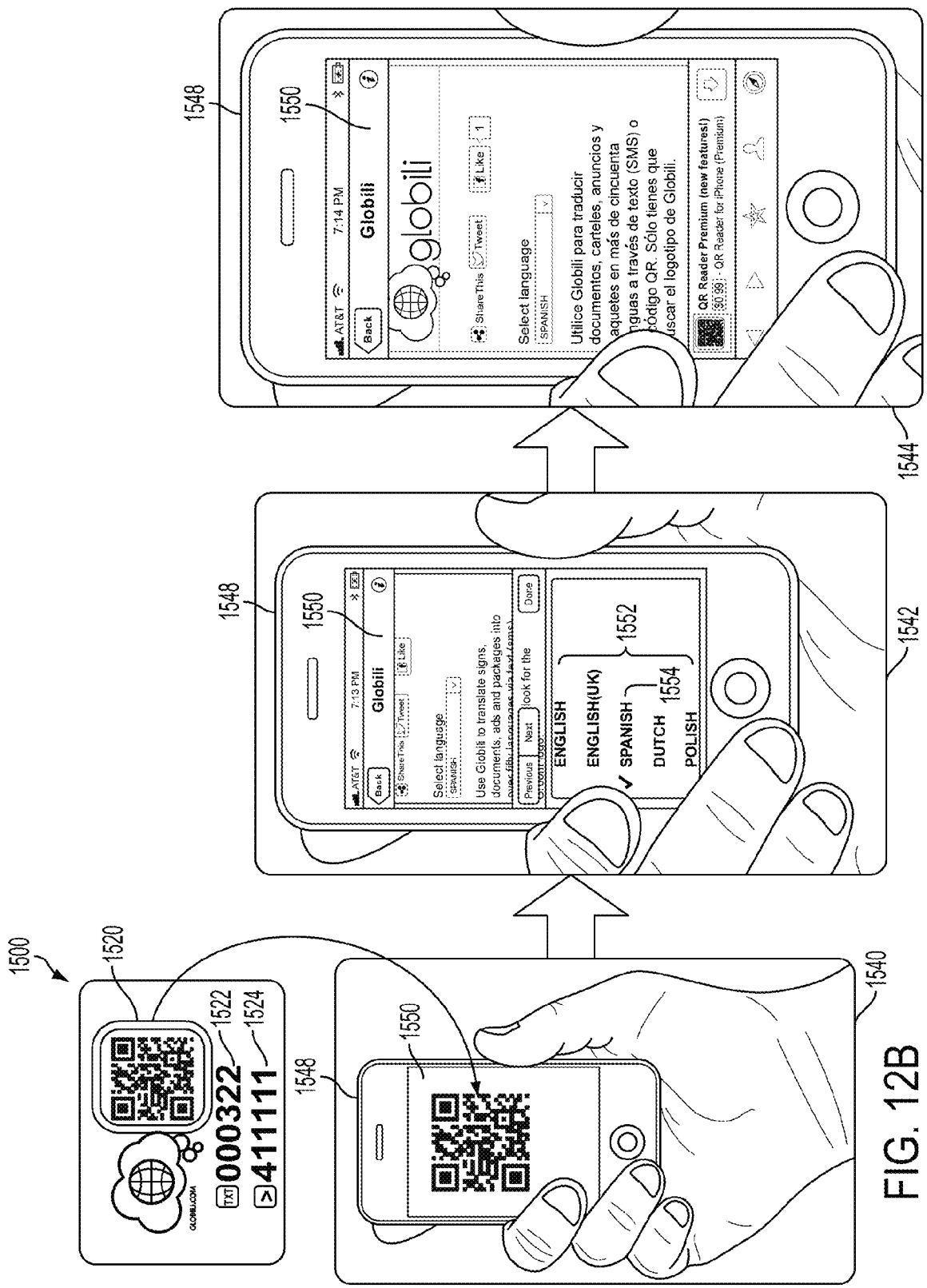

FIGS. 12A-12B depict a series of exemplary interactions with a content management system (such as the content management system 100 of FIG. 1) related to a language selection process in accordance with various non-limiting embodiments. An exemplary tag 1500 is illustrated that can be coupled to (or otherwise associated with) an object, as described above. The tag 1500 includes a plurality of triggers, each of which can be linked to curated content related to the associated object. The tag 1500 in the illustrated embodiment includes a two-dimensional code 1520 (shown as a QR code) and a numeric code 1522 (shown as a SMS code). FIG. 12A depicts a text-based interaction using the SMS trigger and FIG. 12B depicts a web-based interaction using the two-dimensional trigger. As is to be readily appreciated, however, other tags may include other types of triggers.

Generally, SMS is a text messaging service component of phone, web, or mobile communication systems, using standardized communications protocols that allow the exchange of short text messages between fixed line or mobile phone devices. SMS text messaging is the most widely used data application in the world, with 2.4 billion active users, or 74% of all mobile phone subscribers. SMS was originally defined in GSM recommendation 03.40, which is now maintained in 3GPP as TS 23.040. Currently, GSM 03.41 (now 3GPP TS 23.041) defines SMS-Cell Broadcast (SMS-CB), which allows messages (advertising, public information, etc.) to be broadcast to all mobile users in a specified geographical area. Typically, messages are sent to a short message service center (SMSC) which provides a "store and forward" mechanism, where it attempts to send messages to the SMSC's recipients. If a recipient is not reachable, the SMSC queues the message for later retry. Both mobile terminated (MT, for messages sent to a mobile handset) and mobile originating (MO, for those sent from the mobile handset) operations are supported.

Transmission of short messages between the SMSC and the handset is done whenever using the Mobile Application Part (MAP) of the SS7 protocol. Messages are sent with the MAP MO- and MT-Forward SM operations, whose payload length is limited by the constraints of the signaling protocol to 140 octets. Short messages can be encoded using a variety of alphabets: the default GSM 7-bit alphabet, the 8-bit data alphabet, and the 16-bit UTF-16 alphabet. Depending on which alphabet the subscriber has configured in the handset, this leads to the maximum individual short message sizes of 160 7-bit characters, 140 8-bit characters, or 70 16-bit characters. MMS is a standard way to send messages that include multimedia content to and from mobile phones. It extends the core SMS capability that allowed exchange of text messages only up to 160 characters in length.

Additionally, there is a wide variety of one-dimensional and two-dimensional which can be used as triggers, which are described in more detail below, that are specifically designed to allow camera-based recognition. A well-known one-dimensional code is the Universal Product Code (UPC) barcode. Other one-dimensional codes include, without limitation, international standard book number (ISBN) codes, and international article number (EAN) codes. Well-known 2D codes are DataMatrix (described in greater detail in ISO/IEC 16022:2000) and QR Codes (described in greater detail in ISO/IEC 18004:2000, 2006). Barcodes represented data by varying the widths and spacings of parallel lines, and may be referred to as linear or one-dimensional. The very first code was the Universal Product Code (UPC); however, there are other codes such as ISBN, EAN and SCC-14 that represent different types of packaging as well as where they are used in the world.

QR Codes ("Quick Response" Codes) are one example of a two-dimensional barcodes rendered in the form of a symbol comprising a matrix code that is easily captured and interpreted by scanner equipment. It contains information in both vertical and horizontal directions, whereas a classical barcode has only one direction of data (usually the horizontal one). For the purposes of illustration only, compared to a one-dimensional barcode, a QR Code can hold a considerably greater volume of information: 7,089 characters for numeric only, 4,296 characters for alphanumeric data, 2,953 bytes of binary (8 bits) and 1,817 characters of Japanese Kanji/Kana symbols. Further developments in QR code are allowing for even greater capacities of data.

Aside from being able to encode large amounts of information, QR codes are further capable of utilizing diverse types of data, such as text, Uniform Resource Locators (URLs), location, and other data. QR Code may also be configured to have error correction capability. Data can be restored even when substantial parts of the code are distorted or damaged. In the QR Code standard, corners are marked and estimated so that the inside-code can be scanned.

During typical operation the barcode recognition process has 5 steps: (1) edge detection, (2) shape detection, (3) identification of barcode control bar, (4) identification of the barcode orientation, dimensions and bit density using the control bar, and (5) calculating the value of the barcode.

The scanning of a QR Codes can be performed on mobile communications devices equipped with QR Code-reading software (e.g., i-nigma, UpCode, RedLaser, Mobiletag, NeoReader, QuickMark, ScanLife, BeeTagg, Kaywa, Zxing, etc.). Users photograph QR Codes and the software integrated into the mobile communications devices decodes the messages and displays, manipulates, or stores the information on the mobile device. Depending on the type of data recognized and the nature of the application, alternative actions can follow the decoding stage: a phone number can be automatically dialed, a short text message can be sent, a web page corresponding to the decoded URL can be displayed in a mobile browser, or a definite application can be executed.

Referring now to FIG. 12A, at 1502, the SMS code (shown as "000322") 1520 is shown inputted into a mobile communications device 1508. The SMS code 1522 can be inputted as the body of a text message using the text messaging service component of the mobile communications device 1508. Other embodiments, however, can utilize a specialized software application executable on the mobile communications device 1508 to retrieve and send the trigger to the content management system. In any event, the SMS code 1522 is transmitted to a destination address 1524, as indicated on the tag 1500 (shown as "411111"). The destination address 1524, which can be a SMS short code, is associated with a content management system. Once the SMS code 1522 has been transmitted to the content management system as a SMS text message, a language list 1521 is sent to the mobile communications device 1508 and displayed on the display screen 1510 so that a user can select a specific language in which the user wishes to receive the content that is linked to the tag 1500. As described above, the particular languages presented in the language list 1521 can be based, for example, on metadata received along with the SMS code 1522, such as a country code. At 1504, a selection is made by transmitting a selection 1522 from the language selection list 1521 to the content management system. This transmission can be executed as a "reply" to the incoming text message received from the content management system. At 1506, a translation 1523 (shown here in Spanish) associated with the SMS code 1522 and the selection 1522 is sent to the mobile communications device 1508 and displayed on the display screen 1510 as a text message. Subsequent SMS codes dispatched from the mobile communications device 1508, which can be retrieved from other tags, for example, can automatically cause translations to be delivered to the mobile communications device 1508 in the selected language without requiring a need for further language prompts.

At 1540, the two-dimensional code 1520 is shown inputted into a mobile communications device 1548. In one embodiment, the two-dimensional code is inputted into the mobile communications device 1548 using an QR Code-reading software, as described above. The content embedded in the two-dimensional code 1520 can cause the mobile communications device 1548 to send a web-based request to a content management system. A web-page can be returned to the mobile communications device 1548 that includes a language list 1552. In the illustrated embodiment, the language list 1552 includes all available languages for translations. The language selection list 1552 graphical scrolls to allow a user to select a desired language. It is to be appreciated, however, that any suitable technique can be used to display the language selection list and to retrieve a selection, such as a drop down menu, a list with radio buttons, and so forth. At 1544, a web page is displayed on the display screen 1550 of the mobile communications device 1548. The content displayed on the web page is associated with the two-dimensional code 1520 and the selection 1554. Subsequent two-dimensional codes dispatched from the mobile communications device 1548, which can be retrieved from other tags, for example, can automatically cause translations to be delivered to the mobile communications device 1548 in the selected language without requiring a need for further language prompts, as the language selection can be stored as a cookie in the web browser of the mobile communications device.

Figure 13:
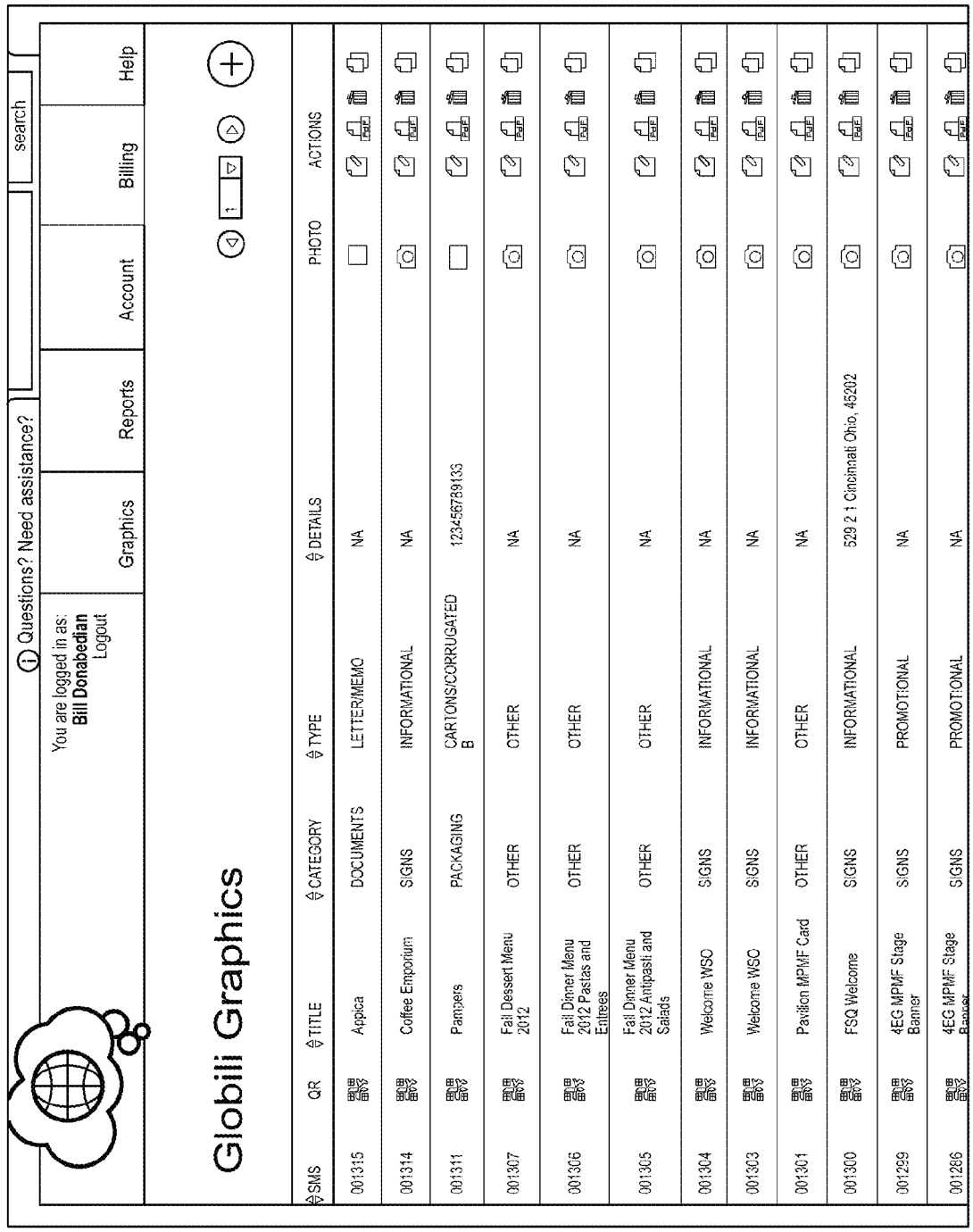
FIG. 13 depicts an exemplary user interface allowing a content curator to interact with a content management system.

FIG. 13 illustrates a simplified exemplary screen shot of a user interface for use by a content curator. In accordance with the system and methods described herein, the content curator can provide content associated with each entry through this interface and subsequently update the content on an as-needed basis. The user interface can be presented, for example, on the computing device 138 (FIG. 1) associated with a content curator 142 (FIG. 1). In the illustrated embodiment, each content entry is associated with two triggers, namely a 2D code (shown as a QR code) and a numeric code number (e.g., "001315", "001314", etc.), which can be generated upon creation of the entry. In the illustrated embodiment, other information related to each entry manageable through the user interface includes title, category, type, and so forth. Other embodiments can use other content management schemas. In the illustrated user interface, other information, such as a location and/or photograph of the associated can be provided by the content curator and associated with the various entries. In some embodiments, various analytics can be provided through this interface, such as the dates/times of when translations for a particular entry were requested.

Figure 14A:
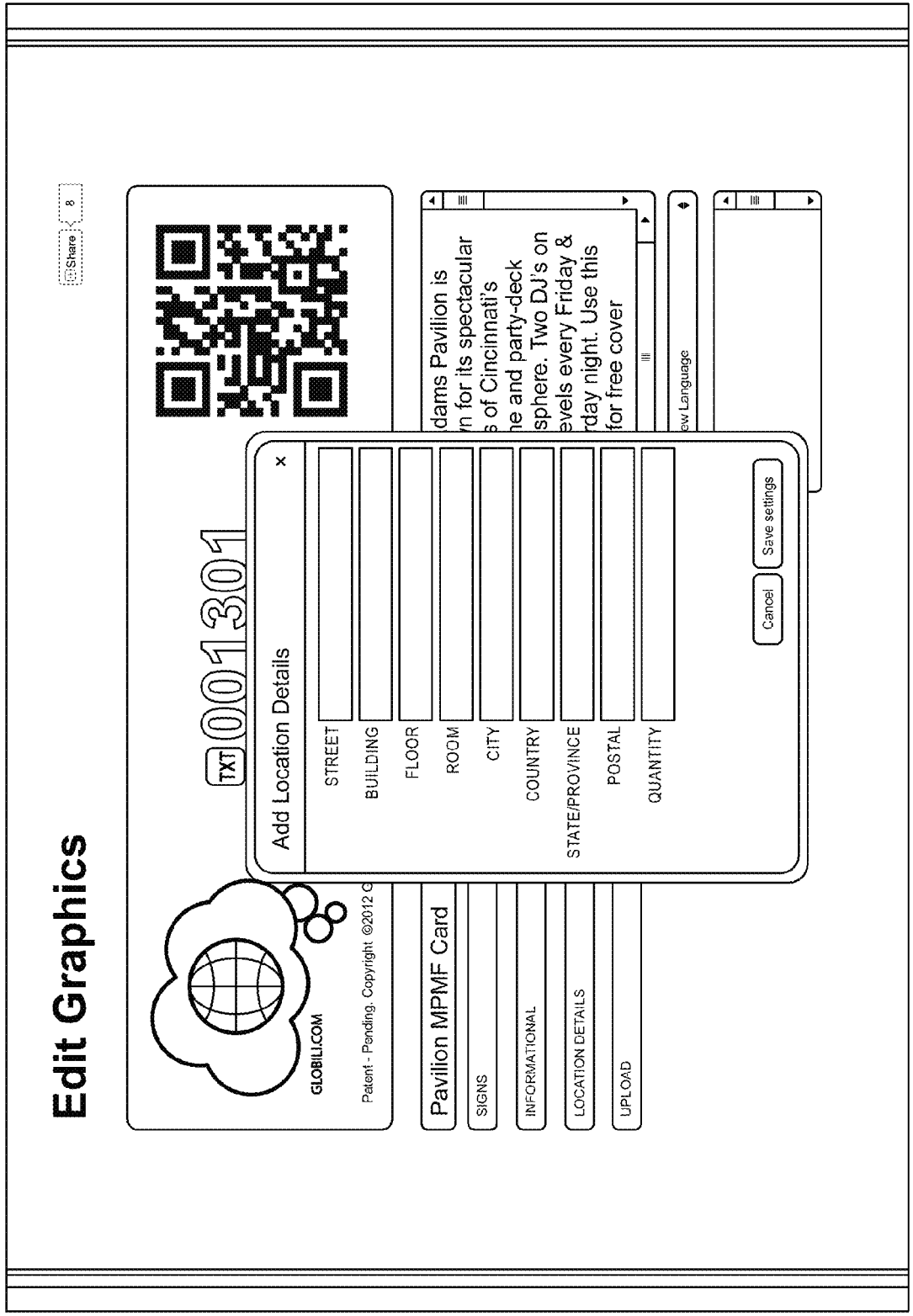
FIGS. 14A-14B depict exemplary user interfaces allowing a content curator to interact with a content management system.
Figure 14B:
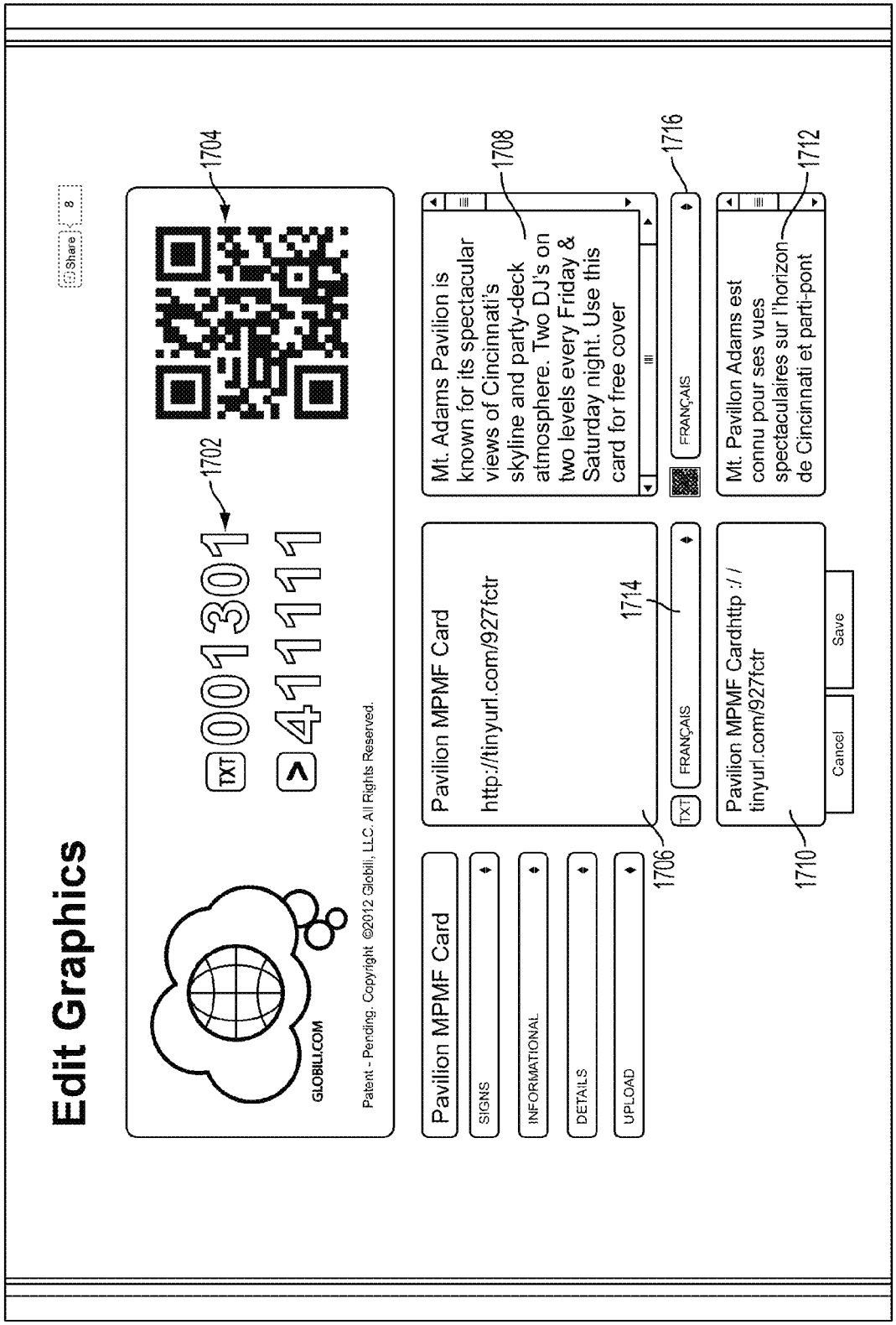

An example user interface through which a content curator can input virtual content and subsequently review and edit translations of the content is shown in FIG. 14A to FIG. 14B. Referring first to FIG. 14A, a content curator can supply information related to a particular object. This information can subsequently be displayed in the user interface as shown in FIG. 13. FIG. 14B shows another example user interface that can be displayed to a content curator. The user interface displays the triggers associated with the text-based content, shown here as a numeric code 1702 and a two-dimensional code 1704. This user interface also displays the particular content that will be delivered to a mobile communications device upon receipt of the trigger. In some embodiments, the content curator can update this content on as as-needed basis. The content associated with the numeric code 1702 is text-message based content 1706 and the content associated with the two-dimensional code 1704 is web-based content 1708. The text-message based content 1706 and the web-based content 1708 can be different, as shown in FIG. 14B, or the content can be the same (as shown in FIG. 12A and FIG. 12B).

The user interface can also include translation preview windows to allow the content curator to view the various translations of the text-message based content 1706 and the web-based content 1708. As shown in FIG. 14B, the translation preview window 1710 is shown displaying the content that will be displayed on a mobile communications device that has sent the numeric code 1702 as a trigger and that has requested a French translation. Similarly, the translation preview window 1712 is shown displaying the content that will be displayed on a mobile communications device that has sent the two-dimensional code 1704 as a trigger and has requested a French translation. Through manipulation of the language selection menus 1714, 1716, the content curator can selectively view the translation of the content in a variety of different languages. In other words, if the content curator were to select "Deutsch" from the language selection menu 1716, the German translation of the web-based content 1708 would be displayed for review. If necessary, the content curator could edit the translation and then store the edited translation, so that the edited translation would be sent to a mobile communications device that has sent the two-dimensional code 1704 as a trigger and has requested a German translation.

Figure 15A:
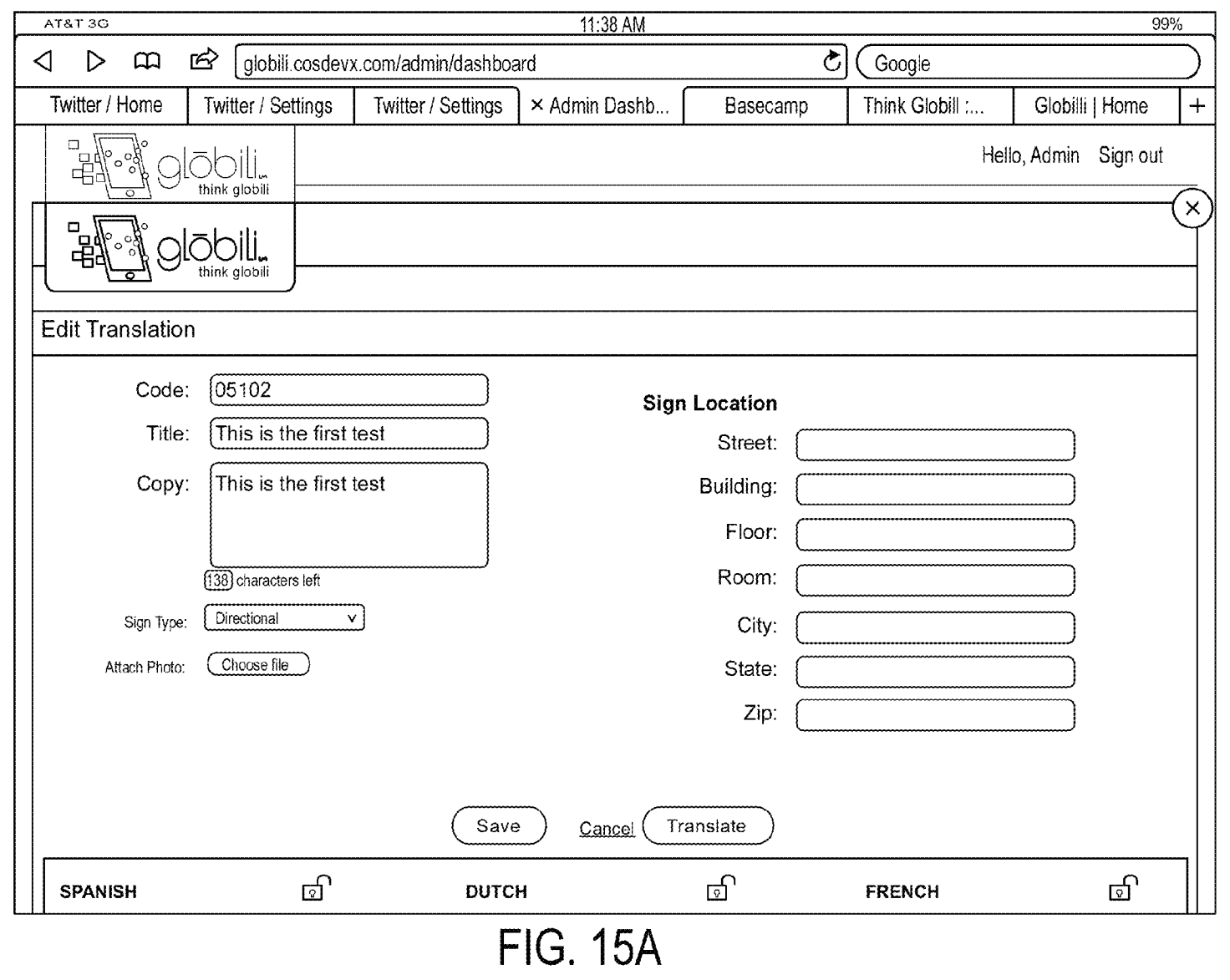
Figure 15B:
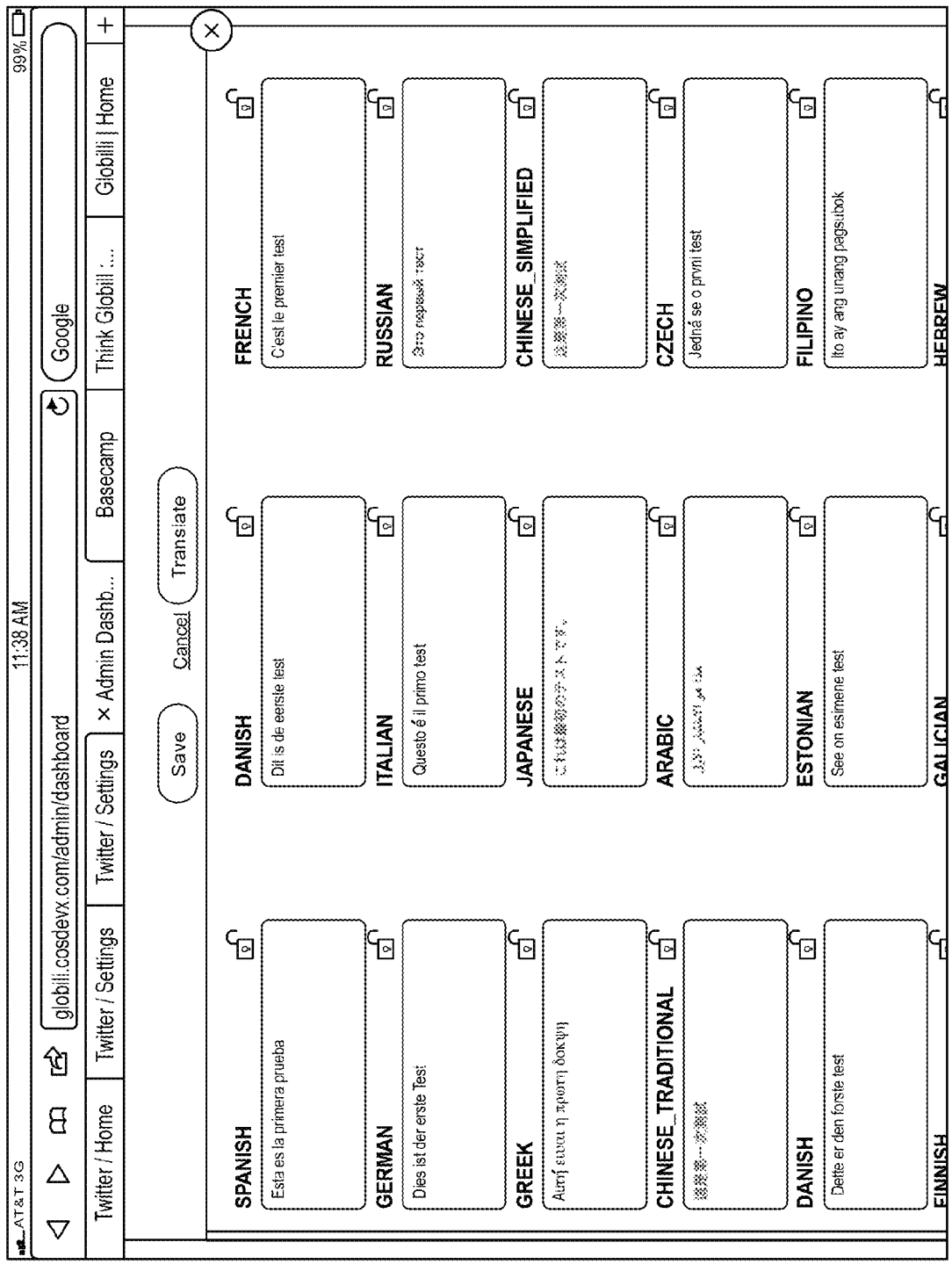

Another example user interface through which a content curator can input virtual content and subsequently review and edit translations of the content is shown extending from FIG. 15A to FIG. 15B. Referring first to FIG. 15A, a content curator can supply information related to a particular object. Additional sign-related information (e.g., sign type, photo, and sign location) can also be provided. Once the text-based content is entered, it can be translated for further evaluation. The translated results can be presented using a global view, as shown in FIG. 15B, where translations from multiple languages are displayed on one screen. In some embodiments, a translation module 132 (FIG. 1) can be utilized to generate the translations that are presented in FIG. 15B. As described above, once the machine-based translations are determined, each translation can be individually edited to satisfaction of the content curator.

Figure 16:
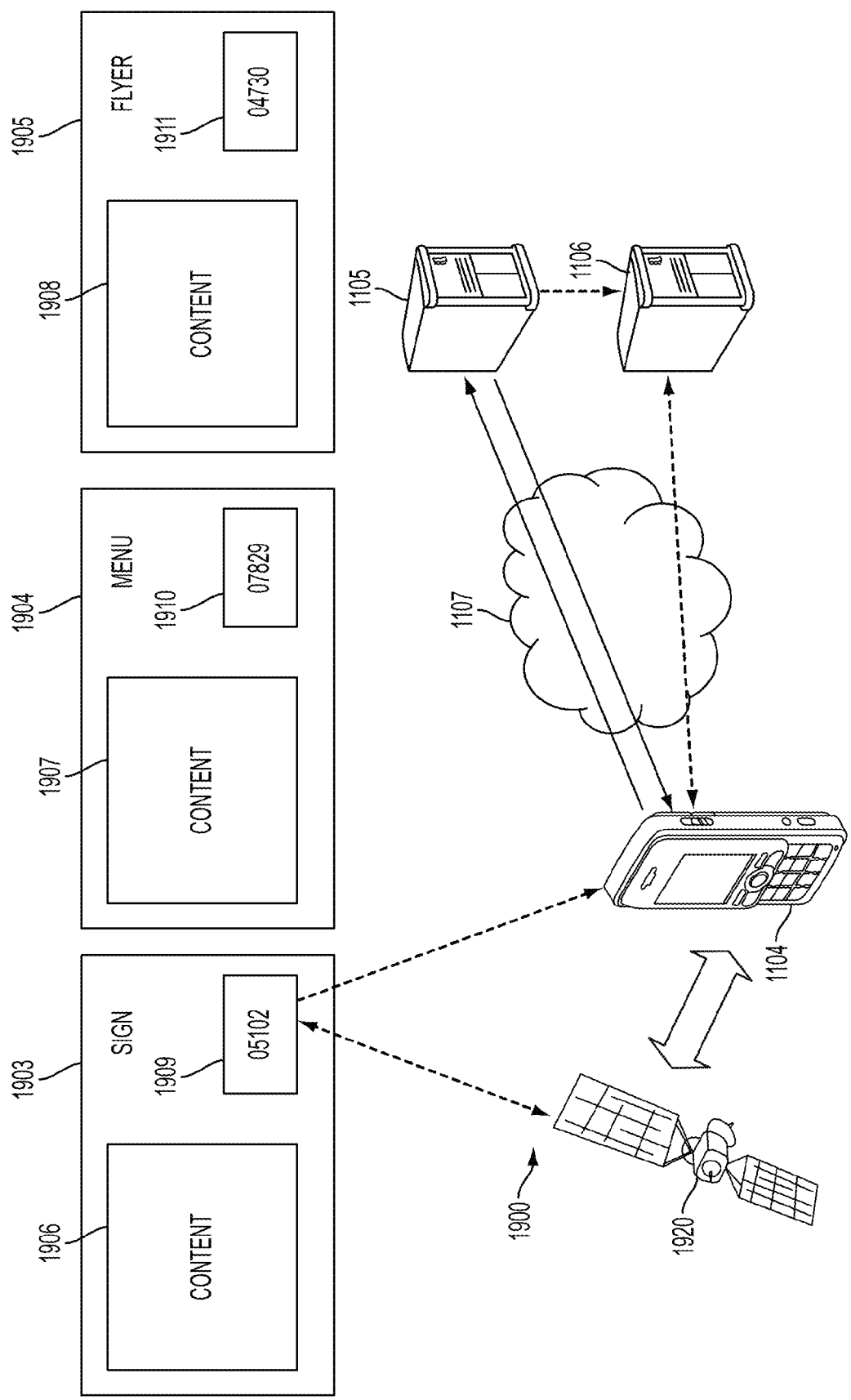
FIG. 16 depicts an alternate embodiment for translating visual indicia.

Turning to FIG. 16, yet another embodiment is disclosed. References 1104-1107 of FIG. 16 correspond to the same references in FIG. 8; the functionalities of each will not be repeated here for the purpose of brevity. In this example embodiment, the mobile communications device 1104 is within visual distance of a sign 1903, a restaurant menu 904 and a promotional flyer 905, each respectively containing content 906-908 and triggers 909-911. In this embodiment, triggers 909-911 are in the form of alphanumeric symbols (e.g., "05102") that are affixed to a surface of a sign using an adhesive sticker or other suitable means. The triggers are chosen to be associated with the content for each respective sign (903-905), where each trigger represents a translation function to be performed on the content.

Continuing with the example, a user may be in front of sign 1903, where content 1906 is displayed. When the user enters trigger 1909 ("05102") into the mobile communications device 1104, the trigger is transmitted to server 1105, which can be part of the content management system 100 (FIG. 1). The entering of trigger 1909 may be done via SMS texting, or through a dialog box or the like that is part of a software application residing on mobile communications device 1104. Once the code is received at server 1105, an initial language confirmation message can be transmitted to mobile communications device 1104, such as "Thank you for requesting translation. Please choose one of the following languages: (1) English, (2) German, (3) French, (4) Spanish," etc. After making entering the language selection from the language selection list, the entry is transmitted back to server 1105. This entry can subsequently be used for providing further translations without needing to interact with the user each time a new translation is requested.

Using automated machine translation, either in real-time time or based on stored translations, the server 1105 transmits the text into the selected language to mobile communications device 1104 that is associated with the trigger 1909. The translated text may be in the form of a SMS message or other suitable communication. Similarly, if a user is presented with menu 1904, the trigger 1910 ("07829") can be entered into mobile communications device 1104, resulting in a translation of content 1907, similar to the processes described above in connection with sign 1903. Likewise, if a user picks up flyer 1905, trigger 911 ("04730") is entered to receive the translation of content 1908.

In addition to the embodiments described herein, it is also possible to utilize translation codes in the context of wireless communication systems, such as global positioning system (GPS), radio frequency identification (RFID) and near-field communication (NFC). As is known in the art, GPS is a space-based satellite navigation system that provides location and time information anywhere on or near the Earth, where there is an unobstructed line of sight to four or more GPS satellites. It is to be understood that the embodiments disclosed herein are also compatible with other location-based systems such as the European Union Galileo positioning system, the Russian Global Navigation Satellite System (GLONASS), Chinese Compass navigation system, and Indian Regional Navigational Satellite System. In addition, other positioning technologies can be used as well including "time of flight" systems that utilize trilateration from the time of propagation of pulsed signals between a transmitter and receiver, ultrasonic trackers, spatial scan, inertial sensing, direct field sensing and phase difference.

With respect to GPS, device 1104 can communicate with one or more satellites 1920 in order to provide and/or receive location-based data. In one embodiment, mobile communications device 1104 automatically appends location data to triggers (1909-1911) before sending the trigger to network 1107. In another embodiment, one or more triggers (1909) are themselves enabled with GPS capabilities and are capable of communicating with satellite(s) 1920 and transmitting the location data to device 1104 together or separately from the code. In yet another embodiment, each tag can carry a predetermined location code that is automatically transmitted wirelessly to mobile communications device 1104, as will be explained in further detail below. In yet another embodiment, the code itself (e.g., "05102") can contain a location component that automatically identifies the location of specific content. In this embodiment, entry of codes does not require the opening of a specific application on the phone, and can transfer location data using native applications (e.g., SMS, MMS) without the need for GPS-based services.

With regard to wireless transmission, one advantageous arrangement includes the use of RFID technology. RFID systems are comprised of two primary components—a transponder, which is typically affixed to the object being identified (e.g., sign, menu, nametag, business card, packaging, etc.) and an interrogator or reader, which can be a read or write/read device. The transponder generally comprises a coupling element and a microchip. The transponder does not require a power source such as a battery; when the transponder is not within the interrogation zone of a reader it is passive. The transponder is only activated when it is within the interrogation zone of a reader, and the power required to activate the transponder is supplied via the wireless coupling unit, as well as the timing pulse and data.

NFC is related to RFID and generally serves as a wireless data interface between devices. Data transmission between two NFC interfaces uses high-frequency magnetic alternating fields in the frequency range of 13.56 MHz, allowing communication of NFC data for up to 20 cm. A NFC interface typically has a 13.56 MHz transmitter and a 13.56 MHz receiver that are alternately connected to an antenna. The antenna may be designed as a large-surface coil or conductor loop. For communication between two NFC interfaces, the individual NFC interface can take on different functions— that of an NFC initiator (master device) or an NFC target (slave device). Communication is typically started by the NFC initiator. In addition, NFC is capable of operating in different operational modes, namely, the active and the passive mode.

During operation, one of the NFC interfaces activates its transmitter and thus works as the NFC initiator. The high-frequency current that flows in the antenna induces an alternating magnetic field which spreads around the antenna loop. Part of the induced magnetic field moves through the antenna loop of the other NFC interface which is in close proximity. A voltage is then induced in the antenna loop and can be detected by the receiver of the other NFC interface. If the NFC interface receives signals and the corresponding commands of an NFC initiator, this NFC interface automatically adopts the roll of an NFC target. For data transmission between the NFC interfaces, the amplitude of the emitted magnetic alternating field is modulated (ASK modulation), similar to the data transmission between RFID reader.

In the passive mode, the NFC initiator also induces a magnetic alternating field for transmitting data to the NFC target. The field's amplitude is modulated in line with the pulse of the data to be transmitted (ASK modulation). However, after having transmitted a data block, the field is not interrupted, but continues to be emitted in an unmodulated way. The NFC target now is able to transmit data to the NFC initiator by generating a load modulation. The load modulation is similar to that performed in RFID systems. Further details may be found in standardization documents ISO/IEC 15693, 14443 et al.

Figure 17A:
FIG. 17A depicts an exemplary tag including a plurality of triggers, including a SMS text code, a QR codes, and wireless communication.

Turning to FIG. 17A, an exemplary RF tag 1000 is disclosed, which, in this embodiment, comprises a QR code 1030, in addition to a long SMS code 1010 and short SMS code 1020. Tag 1000 is preferably embodied as an adhesive sticker that can be affixed to a surface, such as a sign, billboard or menu. Tag 1000 can also be embodied in various configurations and shapes including, but not limited to: horizontal, vertical, square, circle, half-circle, etc. Under one embodiment, users can obtain direct translation of signage using QR code 1030, which was described above. Under another embodiment, users can obtain direct translation of associated signage by sending the short SMS code 1020 to the address indicated by long SMS code 1010. In addition, users may obtain translations of signage utilizing radio-frequency communication, whose circuitry is embedded in tag 1000.

Figure 17B:
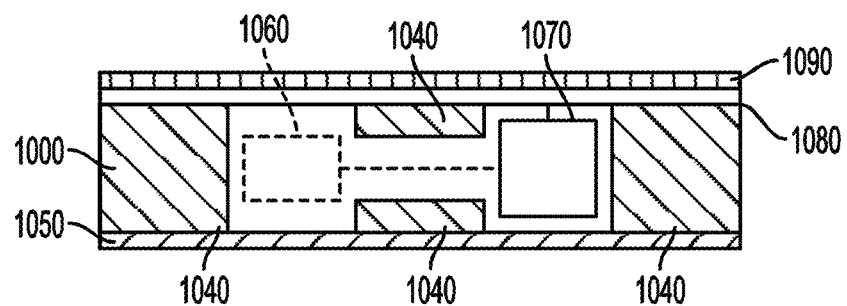
FIG. 17B depicts an exemplary structure for the tag shown in FIG. 17A.

Turning to FIG. 17B, an exemplary structure is disclosed, where an RF chip 1070 is embedded in tag 1000. When using RF communications, such as NFC, the tag operates as a data carrier and contains the translation code programmed into the tag's chip 1070. The chip 1070 can include additional circuitry, such as static and dynamic memory that is known in the art, and is preferably reprogrammable to incorporate multitudes of different codes. Chip 1070 is operatively coupled to tag antenna 1080, which can be wire or printed using conductive ink or other suitable methods. Print surface 1090 can be affixed over the surface of antenna 1080 to convey SMS codes and/or QR codes illustrated in FIG. 17A.

Under one embodiment, the tag 1000 comprises a filler 1040, which can be an epoxy, rubber, resin and the like, which serves to stabilize the chip 1070, as well as any additional circuitry 1060 embedded into the tag 1000. The additional circuitry 1060 can include an external memory or digital signal processing circuits; alternately, circuitry 1060 can be a battery or other power source. It is understood by those skilled in the art that circuitry 1060 and the filler 1040 is optional and can be omitted, depending on the shape, configuration and operational needs of the tag. Under one exemplary embodiment, an adhesive surface 1050 can be constructed on a bottom portion of tag 1000, preferably opposite a printed side 1090 that would face a user. Using an adhesive on the tag 100, however, is merely one configuration. In some embodiments the QR code 1030, the long SMS code 1010 and/or the short SMS code 1020 (or other triggers) are displayed on a video screen, or otherwise projected onto a viewable surface. Example video screens include television screens, mobile communication device screens, and any other screen that converts a video signal to viewable content. Thus, the triggers can be presented, displayed or otherwise conveyed in any suitable medium or format. Non-limiting example mediums include print-based mediums, video-based mediums, and audio-based mediums.

Figure 18:
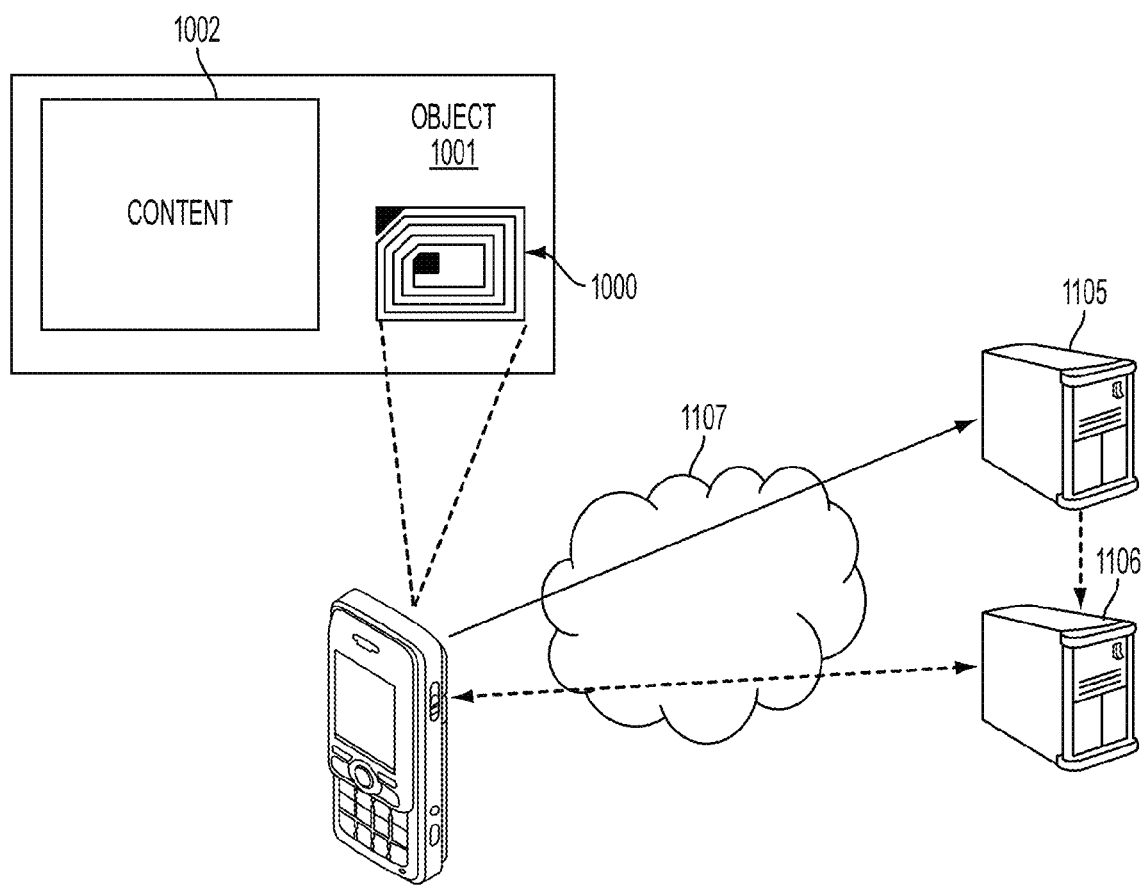
FIG. 18 depicts an exemplary embodiment using a radio frequency (RF) tag.

Turning to FIG. 18, an example embodiment depicting the use of an RF tag is illustrated. References 1104-1107 of FIG. 18 correspond to the same references in FIG. 8; the functionalities of each will not be repeated here for the purpose of brevity. In this example embodiment, the mobile communications device 1104 is within a relatively short distance of an object 1001 that is coupled to a tag 1000. The tag 100 can be associated with the content 1002 associated with the object 1001. A user may be in close proximity to the object 1001 such that a reader antenna from the mobile communications device 1104 captures trigger data provided by the tag 1000. The reader of the mobile communications device 1104 can be configured to read multiple tags simultaneously. Middleware configured in the mobile communications device 1104 can interacts with the reader, and communicates the trigger to a content management system. Under one embodiment, the tag 1000 is pre-programmed with the actual translation of the signage to which it is affixed. Under this embodiment, the memory portion of the chip 1070 (or external memory 1060 under an alternate embodiment) contains a pre-stored listing of translations in numerous languages of the signage. As a mobile communications device's antenna communicatively couples to the tag 1000, software is triggered on the mobile communications device to select a particular language for translation. In cases where a user's profile contains a preferred, pre-stored language, the tag 1000 can automatically transmit the translation to the user device.

To obtain a translation, the trigger read from the tag 1000 is transmitted to server 1105, which can be part of the content management system 100 (FIG. 1). The transmission of the trigger can be executed by a software application residing on mobile communications device 1104. Once the trigger is received at server 1105, an initial language confirmation message can be transmitted to mobile communications device 1104, such as "Thank you for requesting translation. Please choose one of the following languages: (1) English, (2) German, (3) French, (4) Spanish," etc. After making entering the language selection from the language selection list, the entry is transmitted back to server 1105. This entry can subsequently be used for providing further translations without needing to interact with the user each time a new translation is requested. Using automated machine translation, either in real-time time or based on stored translations, the server 1105 transmits the text into the selected language to mobile communications device 1104 that is associated with the tag 1000. The translated text may be in the form of a SMS message or other suitable communication.

Figure 19:
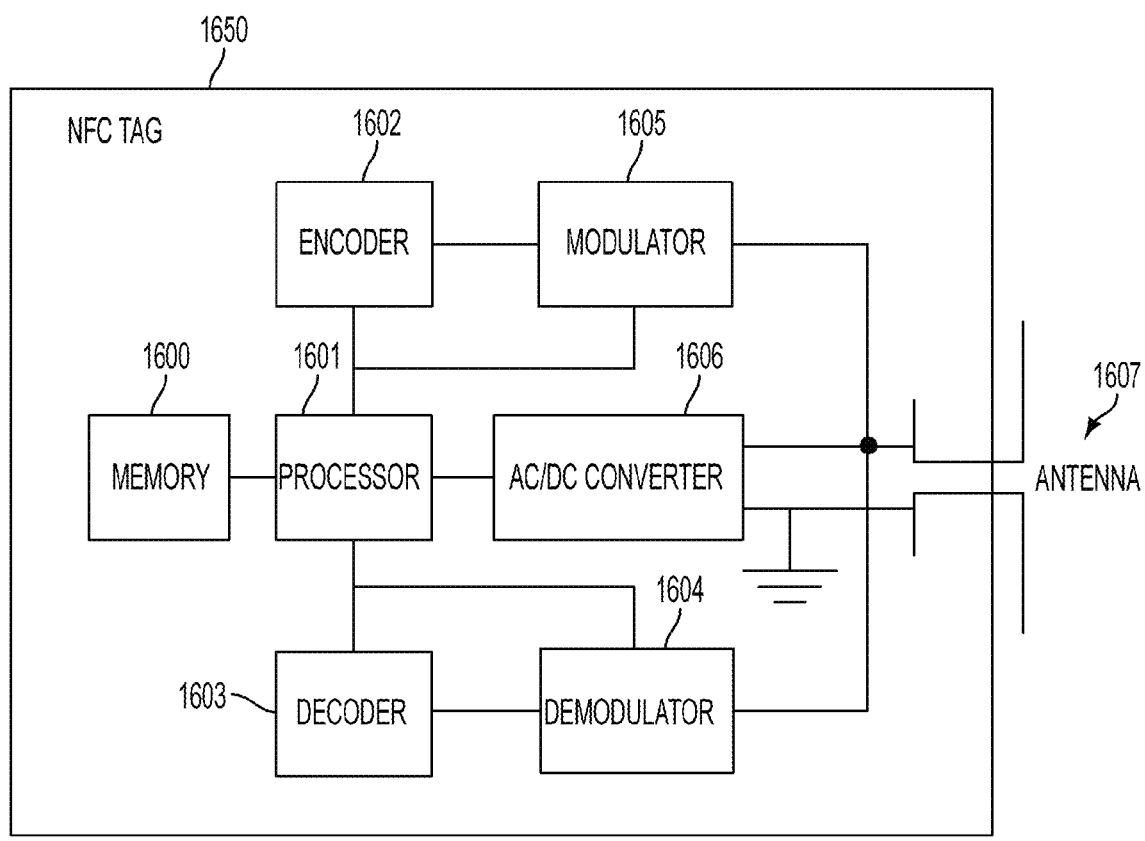
FIG. 19 depicts an example block diagram for a wireless communication circuit.

FIG. 19 illustrates an exemplary configuration of a radio frequency (NFC) tag or transponder 1650 which can be used as a trigger in accordance with the system and methods described herein. An antenna 1607, which is preferably external to the tag chip, is configured to wirelessly transmit and/or receive data using known techniques, and is coupled to AC/DC converter 1606. Additionally, the antenna 1607 is coupled to a demodulator 1604 and a modulator 1605, which in turn may be coupled to a decoder 1603 and an encoder 1602, respectively, and a processor 1601. The processor 1601 is coupled to memory 1600 for storing and/or retrieving data, depending on the mode of operation. During typical operation, a reader continuously emits RF carrier signals, and keeps observing the received RF signals for data. When a tag comes within communication range, the tag modulates the RF field, which in turn is detected by the reader. The tag absorbs a small portion of the energy emitted by the reader, and starts sending modulated information when sufficient energy is acquired from the RF field generated by the reader. In one embodiment, the data modulation (modulation for 0s and 1s) may accomplished by either direct modulation, frequency shift keying (FSK) or phase modulation. The reader demodulates the signals received from the tag antenna, and decodes the same for further processing.

One preferred modulation scheme comprises backscatter modulation, where the tag coil (load) is shunted depending on the bit sequence received. This in turn modulates the RF carrier amplitude. The reader detects the changes in the modulated carrier and recovers the data in order to receive the trigger. Encoded binary digits modulate the RF carrier, where a "1" represents a high carrier level, and a "0" represents a low carrier level (i.e., the tag coil is shunted). A reader demodulates the signals to recover the data, then decodes the data using suitable decoder, and can forwards it to a content management system for further processing.

Figure 20:
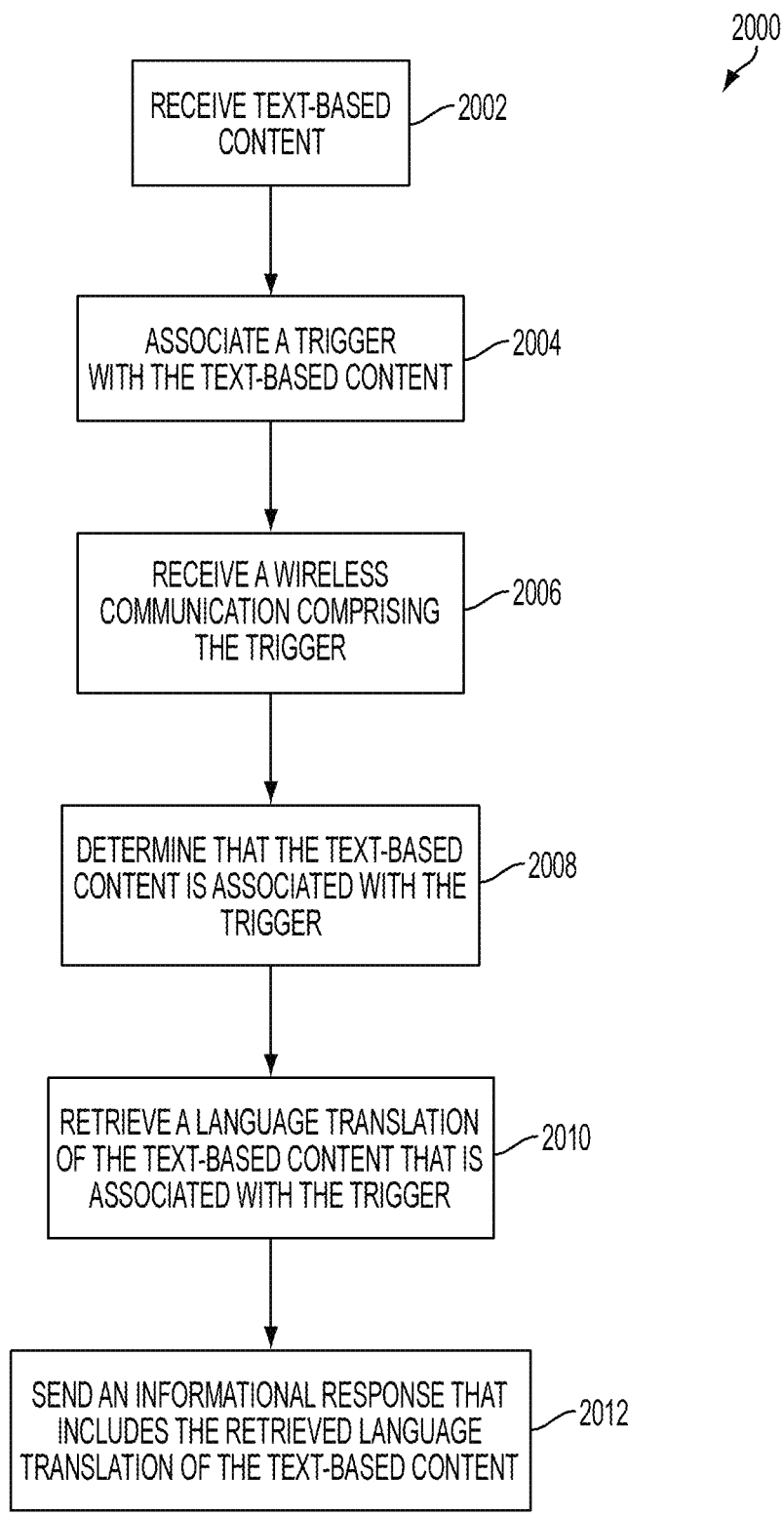
FIGS. 20-21 depict example process flows for dynamic content management in accordance with various non-limiting embodiments.

FIG. 20 depicts an example content management process 2000 in accordance with one non-limiting embodiment. Referring to FIG. 1 and FIG. 20, at 2002, text-based content is received from a remote computing device. The text-based content can be received by the content management system 100 from the remote computing device 138 associated with a content curator. The text-based content can include any suitable type of language-related content that can be stored and processed by the content management system 100. At 2004, a trigger is associated with the text-based content. Example triggers include, for example, the numeric code 1702 and a two-dimensional code 1704, as shown in FIG. 14B. At 2006, a wireless communication comprising the trigger is received. The wireless communication can be received from the mobile communications device 104, for example. At 2008, it is determined that the text-based content received at 2002 is associated with the trigger that was received at 2006. At 2010, a language translation of the text-based content is retrieved that is associated with the trigger. In some embodiments, the translated content is retrieved from the content database 126. At 2012, an informational response is sent to the mobile communications device 104 that comprises the retrieved language translation of the text based content.

Figure 21:
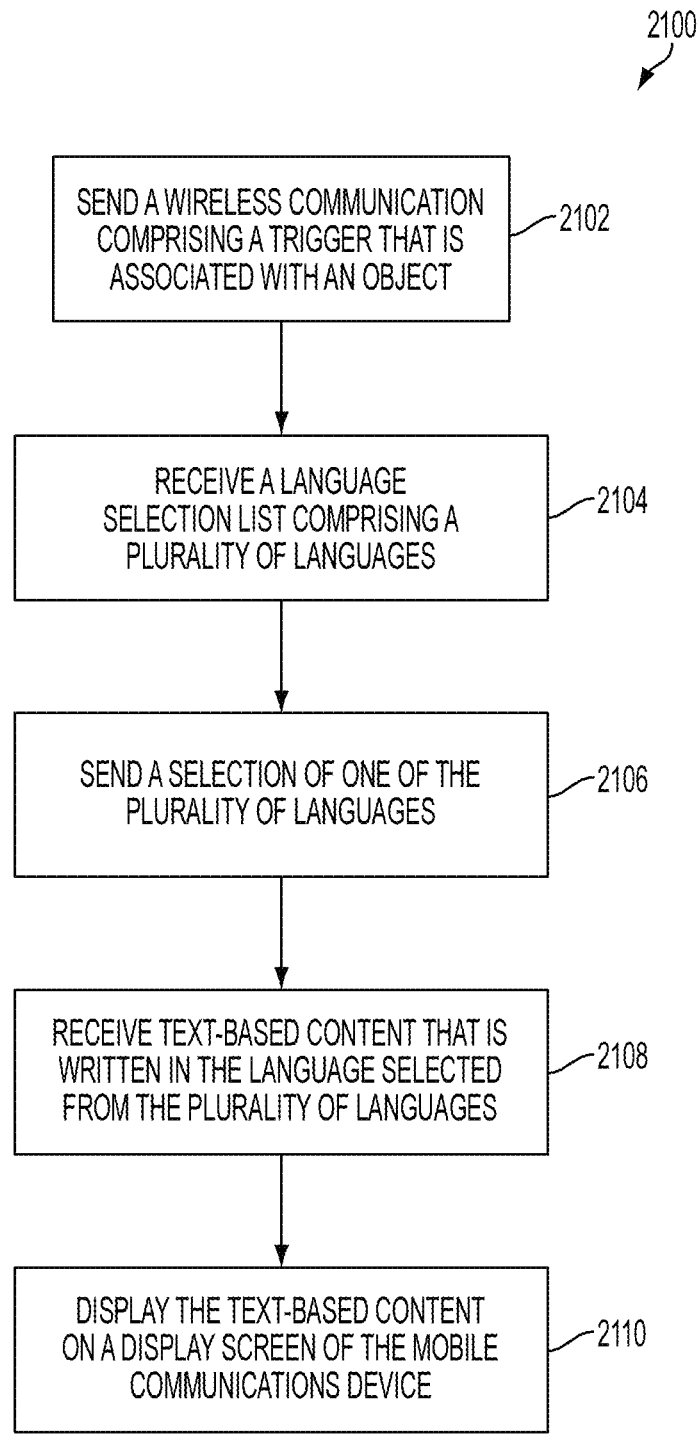

FIG. 21 depicts another example content management process 2100 in accordance with one non-limiting embodiment. Referring to FIG. 1 and FIG. 21, at 2102, a wireless communication that includes a trigger associated with an object is sent by the wireless communications device 104. At 2104, a language selection list is received by the wireless communications device 104. The language selection list can be in the form of a text-based list, or a list on a webpage, for example. At 2106, a selection of one of the languages from the language selection list is sent by the wireless communications device 104. At 2108, text-based content is received by the wireless communications device 104 from the content management system 100. The text-based content is written in the language that was selected at 2106. At 2110, the text-based content is displayed on the display screen of the mobile communications device 104.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-based method, comprising:
   receiving, by a content management computing system, a trigger from a remote computing device;
   receiving, by the content management computing system, language-based content from the remote computing device for association with the trigger;
   storing, by the content management computing system, the language-based content in a content database;
   linking, by the content management computing system, the trigger with the language-based content;
   subsequent to linking the trigger with the language-based content, receiving, by the content management computing system, a wireless communication comprising the trigger from a first mobile communications device;
   after receiving the wireless communication, determining, by the content management computing system, content stored in the content database that is linked to the trigger, wherein the content is the language-based content;
   sending a first informational response to the first mobile communications device, the first informational response comprising the retrieved language-based content;
   allowing, by the content management computing system, alteration of the language-based content stored in the content database that is linked to the trigger;
   responsive to receiving an alteration to the language-based content, storing, by the content management computing system, the altered language-based content in the content database, wherein the link to the trigger is maintained;
   responsive to receiving a second wireless communication comprising the trigger from a second mobile communications device, retrieving, by the content management computing system, the altered language-based content that is linked to the trigger; and
   sending a second informational response to the second mobile communications device, the second informational response comprising the retrieved altered language-based content.

2. The computer-based method of claim 1, wherein the trigger is any of a visual code, a numeric code, an alphanumeric code, a biometric code, a genetic code, a geographic-based code, an audio code, an acoustic code, a wireless communication code, a quick response (QR) code, a barcode, a short message service (SMS) code, a multimedia messaging service (MMS) code, an acoustic fingerprint technology (AFT) code, a radio-frequency identification (RFID) code, and a near field communication (NFC) code.

3. The computer-based method of claim 1, wherein the trigger received from the remote computing device is a bar code associated with a physical object.

4. The computer-based method of claim 1 further comprising:
   after receiving the wireless communication, retrieving a language translation of the language-based content that is linked to the trigger; wherein the first informational response comprises the retrieved language translation of the language-based content.

5. The computer-based method of claim 4 further comprising:
storing a plurality of language translations of the language-based content in the content database, wherein the retrieved language translation is one of the plurality of language translations.

6. The computer-based method of claim 5 further comprising:
receiving a text-based edit to one of the plurality of language translations of the language-based content from the remote computing device; and
storing an edited translation in the content database.

7. The computer-based method of claim 5 further comprising:
storing a plurality of language translations of the altered language-based content in the content database;
wherein sending the second informational response comprising sending, to the second mobile communications device one of the plurality of language translations of the altered language-based content.

8. The computer-based method of claim 4 further comprising:
after receipt of the wireless communication from the mobile communications device, determining a plurality of languages to include in a language selection list;
sending the language selection list to the mobile communications device; and
receiving, an indication of a selection of one of the languages from the language selection list from the mobile communications device, wherein sending the translation of the updated language-based content comprises sending the translation of the updated language-based content in the selected language.

9. The computer-based method of claim 4, wherein the language-based content received from a remote computing device comprises audio-based content, and wherein the retrieved language translation of the language-based content comprises a language translation of the audio-based content.

10. The computer-based method of claim 1 further comprising:
causing the presentment of a graphical user interface at the remote computing device, wherein the trigger is received through the graphical user interface, wherein the language-based content is received through the graphical user interface; and wherein the language-based content can be altered through the graphical user interface.

11. The computer-based method of claim 10 further comprising
storing analytics data related to the wireless communications received from the first and second mobile communications devices and the first and second informational responses, wherein the analytics data is accessible to the remote computing device; and
causing the presentment of the analytics on the graphical user interface.

12. The computer-based method of claim 1, wherein the language-based content received from a remote computing device comprises text-based content.

13. A computer-based method, comprising:
causing the presentment of a graphical user interface at the remote computing device by a content management computing system,
receiving, by a content management computing system through an input to the graphical user interface from a remote computing device, a barcode;
receiving, by the content management computing system through an input to the graphical user interface from the remote computing device, language-based content for association with the barcode;
storing, by the content management computing system, the language-based content in a content database;
linking, by the content management computing system, the barcode with the language-based content;
subsequent to linking the barcode with the language-based content, receiving, by the content management computing system, a wireless communication comprising the barcode from a first mobile communications device;
after receiving the wireless communication, determining, by the content management computing system, content stored in the content database that is linked to the barcode, wherein the content is the language-based content;
sending a first informational response to the first mobile communications device, the first informational response comprising the retrieved language-based content;
allowing, by the content management computing system, alteration of the language-based content stored in the content database that is linked to the barcode;
responsive to receiving an alteration to the language-based content, storing, by the content management computing system, the altered language-based content in the content database, wherein the link to the barcode is maintained;
responsive to receiving a second wireless communication comprising the barcode from a second mobile communications device, retrieving, by the content management computing system, the altered language-based content that is linked to the barcode; and
sending a second informational response to the second mobile communications device, the second informational response comprising the retrieved altered language-based content.

14. The computer-based method of claim 13 further comprising:
storing analytics data related to the wireless communications received from the first and second mobile communications devices and the first and second informational responses, wherein the analytics data is accessible to the remote computing device.

15. The computer-based method of claim 13, wherein the barcode received from the remote computing device is a barcode associated with a physical object.

16. The computer-based method of claim 15, wherein the physical object is packaging.

17. The computer-based method of claim 13 wherein the language-based content received through the graphical user interface can be altered through the graphical user interface.

18. A computer-based system, comprising:
a content management computing system comprising a non-transitory computer-readable medium having computer-executable instructions stored thereon, the computer-executable instructions configured to instruct one or more computer processors to perform the following operations:
receive a barcode from a remote computing device;
receive language-based content from the remote computing device for association with the barcode;
store the language-based content in a content database;
link the barcode with the language-based content;

subsequent to linking the barcode with the language-based content, receive a wireless communication comprising the barcode from a first mobile communications device;

after receiving the wireless communication, determine content stored in the content database that is linked to the barcode, wherein the content is the language-based content;

send a first informational response to the first mobile communications device, the first informational response comprising the retrieved language-based content;

allow alteration of the language-based content stored in the content database that is linked to the barcode;

responsive to receiving an alteration to the language-based content, store the altered language-based content in the content database, wherein the link to the barcode is maintained;

responsive to receiving a second wireless communication comprising the barcode from a second mobile communications device, retrieve the altered language-based content that is linked to the barcode; and send a second informational response to the second mobile communications device, the second informational response comprising the retrieved altered language-based content.

* * * * *